(12) United States Patent
May et al.

(10) Patent No.: US 12,253,497 B2
(45) Date of Patent: Mar. 18, 2025

(54) UNITARY DISTRIBUTION PLATE AND CONFIGURABLE DIAPHRAGM

(71) Applicant: ABB Schweiz AG, Baden (CH)

(72) Inventors: Michael J. May, Bartlesville, OK (US); Jason Aaron Lawrence, Owasso, OK (US)

(73) Assignee: ABB Schweiz AG, Baden (CH)

(*) Notice: Subject to any disclaimer, the term of this patent is extended or adjusted under 35 U.S.C. 154(b) by 227 days.

(21) Appl. No.: 17/678,617

(22) Filed: Feb. 23, 2022

(65) Prior Publication Data
US 2023/0266280 A1 Aug. 24, 2023

(51) Int. Cl.
*G01N 30/20* (2006.01)
*G01N 30/66* (2006.01)
*G01N 30/88* (2006.01)
*G01N 30/02* (2006.01)

(52) U.S. Cl.
CPC ............. *G01N 30/20* (2013.01); *G01N 30/66* (2013.01); *G01N 30/88* (2013.01); *G01N 2030/025* (2013.01); *G01N 2030/8881* (2013.01)

(58) Field of Classification Search
CPC .............................................. G01N 2030/8881
See application file for complete search history.

(56) References Cited

U.S. PATENT DOCUMENTS

| 3,613,729 | A | * | 10/1971 | Dora ..................... F16K 31/524 |
|||||251/331|
| 4,869,282 | A | | 9/1989 | Sittler et al. |
| 4,935,040 | A | * | 6/1990 | Goedert ................. G01N 30/20 |
|||||96/417|
| 5,950,674 | A | | 9/1999 | Wylie et al. |
| 6,453,725 | B1 | | 9/2002 | Dahlgren et al. |
| 6,896,238 | B2 | | 5/2005 | Wang |
| 7,992,423 | B2 | | 8/2011 | Bailey et al. |
| 8,960,230 | B2 | | 2/2015 | Weber |
| 2002/0131905 | A1 | | 9/2002 | Cordhill |
| 2007/0204673 | A1 | | 9/2007 | Bailey |
| 2021/0199627 | A1 | * | 7/2021 | Steen ................. G01N 30/6095 |

* cited by examiner

*Primary Examiner* — Jamel E Williams
*Assistant Examiner* — Alex T Devito
(74) *Attorney, Agent, or Firm* — McCarter & English, LLP; Michael M. Gnibus

(57) ABSTRACT

A unitary distribution plate of a Gas chromatograph (GC) module having a plurality of valve bores disposed on a bottom surface of the unitary distribution plate and a least one sensor cell and at least one column port machined into the top surface of the unitary distribution plate. The valve bores and sensor cells are connected by fluid pathways within a thickness of the distribution plate. The pathways include a combination of planar, longitudinal, diagonal, and radial fluid pathways relative to the top surface of the distribution plate. The fluid channels are formed by diffusion bonding or more generally laminating multiple plates into the unitary distribution plate.

29 Claims, 23 Drawing Sheets

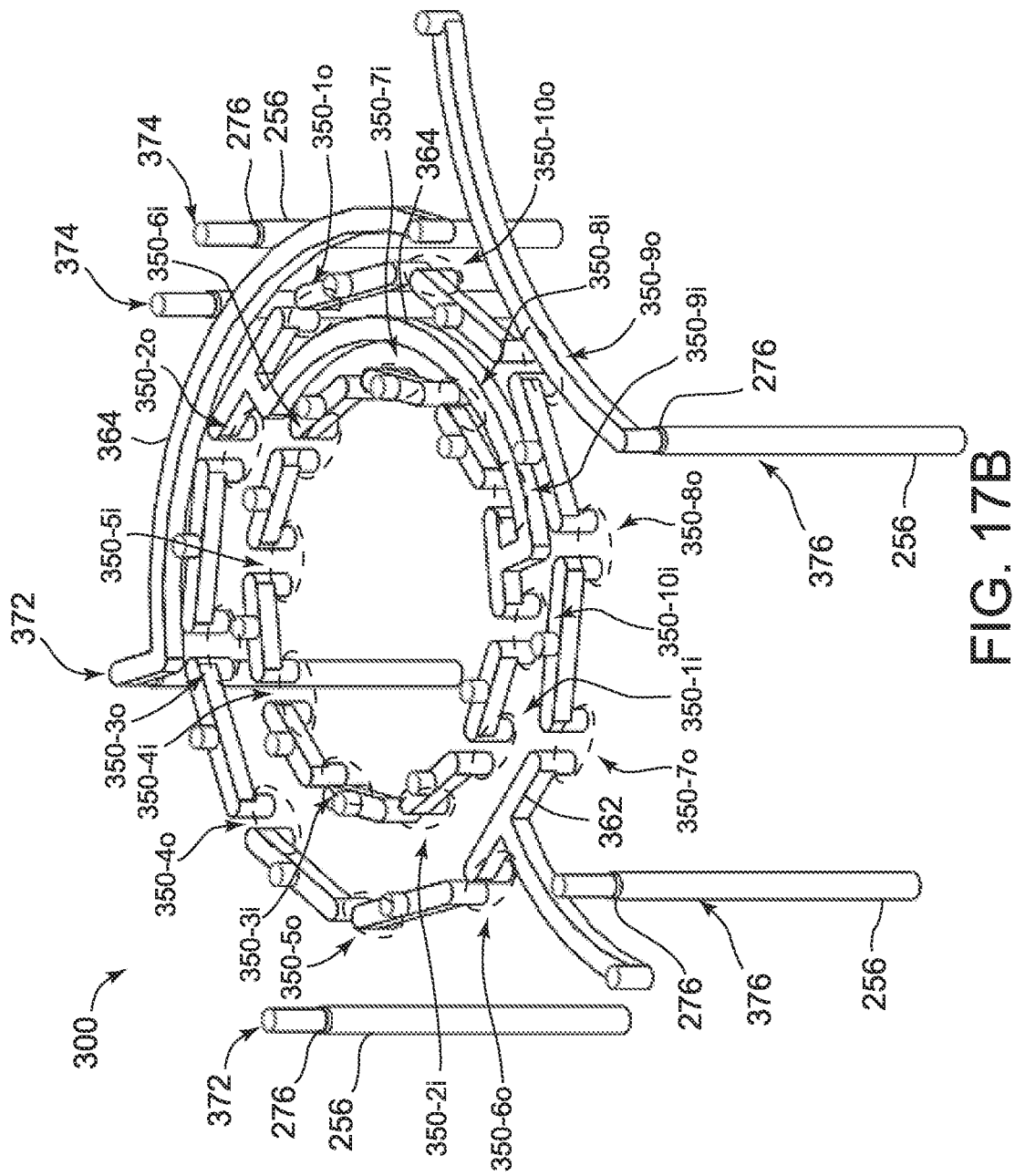

UNITARY DISTRIBUTION PLATE AND CONFIGURABLE DIAPHRAGM

TECHNICAL FIELD

The present disclosure relates generally to gas chromatograph apparatus and systems that include distribution systems for directing gases through the chromatograph, and more particularly to a gas chromatograph apparatus and system having a unitary distribution plate that includes a plurality of valve ports, and a configurable diaphragm for selectively opening or closing the plurality of valve ports.

DISCUSSION OF ART

Conventional analyzers such as a gas analyzers and gas chromatographs (herein collectively referred to as "GC") utilize one or more GC modules to conduct testing and sampling of a gaseous or liquid sample to produce a GC profile for a sample gas.

A GC module utilizes a plumbing arrangement to route the gas sample from a gas manifold to sensors and GC columns within an insulated oven of the GC module. Gas chromatography applications frequently require a unique plumbing arrangement (i.e. Reverse Column Step, Backflush to Measure, or Heartcut etc.) for a given process. GC plumbing arrangements are complicated, typically comprising a conduit network having a plurality of delivery conduits. Each conduit possesses a specifically defined path required to enable a specific GC application. The defined paths are typically non-linear and are interleaved in a crisscrossing pattern. As a result, such plumbing arrangements are difficult to manufacture and assemble. The fact that plumbing arrangements are unique and designed for a specific GC application exacerbates the current design and manufacturing challenges associated with GC systems.

Such plumbing arrangements are typically defined using a series of distribution plates that are conventionally stacked together, configured in an array, or connected through tubing to one another, with each interface between distribution plates and tubing being gasketed or more generally insulated from the outside environment. Such configurations increase the overall envelope and complexity of the GC module, resulting in increased cost, additional components, additional modes of failure of individual components, and leaking between connectors of the components.

Each plumbing arrangement requires multiple different tubes or multiple different distribution plates all unique to the plumbing arrangement and function of the GC module. Tubing between plates can be reduced or eliminated by stacking distribution plates and aligning fluid pathways machined onto the upper and lower surfaces of the stacked distribution plates. Plumbing arrangements of increasing complexity are achieved by stacking additional plates with additional machined fluid pathways of the surfaces of the plates. Stacked distribution plates benefit from reduced connections and fittings between plates, however the stacked distribution plates are conventionally gasketed by thin films which are prone to abrasion or deterioration due to mechanical opening and closing of valves. Thin films between plates are also prone to scratches or abrasion during handling and installation, which can cause leakage. Thus, where additional stacked plates are used to increase plumbing complexity, additional thin films increase the likelihood of leakage.

For example, a first distribution plate conventionally includes valves machined into a bottom surface of the plate which open and close fluid pathways downstream from the first distribution plate. The valve ports are fluidly connected to fluid pathways on the top surface of the first distribution plate via diagonal or longitudinal holes bored through the distribution plate. A bottom surface of a second distribution plate is positioned against the top surface of the first distribution plate such that features such as additional valves or fluid pathways machined into the bottom surface of the second distribution plate are aligned and in fluid communication with the fluid pathways on the top surface of the first distribution. A top surface of the second distribution plate can further include machined column ports or testing cells connected to the features of the bottom surface via diagonal or longitudinal holes bored through the second distribution plate. More complex plumbing arrangement can have additional distribution plates forming additional downstream pathways. Such a configuration eliminates tubing connections between valve ports on the bottom distribution plate and testing cells or column ports on the top distribution plate, however any change in the plumbing arrangement will require re-machining of all distribution plates impacted by the change, as well as the development of one or more of the thin film gasket between the distribution plates.

Frequent replacement and changing of multiple components can result in wear on the surfaces of the distribution plates and deterioration of the thin film gasket between the distribution plates as well as increased downtime of the GC module. Individual distribution plates for a given plumbing arrangement are often not compatible with individual distribution plates of another plumbing arrangement, resulting in multiple components needing to be changed.

Thus, there is a need in the art to provide a simplified GC module configuration that comprises fewer components to define the complex conduit systems, enables simplified means for modifying system design and manufacture and reduces overall GC system complexity.

SUMMARY

In one aspect, a distribution plate of a gas chromatograph module is disclosed. The distribution plate includes a unitary top surface and a bottom surface defining a thickness, a plurality of apertures disposed on the top surface extending partially into the thickness, a plurality of valve bores disposed on the bottom surface extending partially into the thickness and, at least one planar fluid pathway disposed within the thickness fluidly connecting the plurality of valve bores to the plurality of apertures.

In another aspect, a modular valve subassembly of a GC module is disclosed. The modular valve subassembly comprises pilot plate having a top surface, a bottom surface, and a plurality of control holes disposed coaxially on the top surface of the pilot plate; a diaphragm having an upper diaphragm membrane disposed against the top surface of the pilot plate; and, a distribution plate having a top surface and a bottom surface defining a thickness; a plurality of apertures disposed on the top surface extending partially into the thickness, a plurality of valve bores disposed on the bottom surface extending partially into the thickness, and at least one planar fluid pathway disposed within the thickness fluidly connecting the plurality of valve bores to the plurality of apertures. The plurality of control holes of the pilot plate are coaxial with a first valve bore and an adjacent second valve bore of the distribution plate. The plurality of control holes are configured to at least partially deflect the upper diaphragm membrane upon venting of pressure from the plurality of control holes; wherein the upper diaphragm membrane deflects into the plurality of control holes, opening a fluid path between the first valve bore and the adjacent second valve bore.

In yet another aspect, a diaphragm for opening and closing valve bores of a distribution plate of a GC module is disclosed. The diaphragm includes an upper diaphragm membrane positioned against a bottom surface of the distribution plate. the upper diaphragm membrane is configured to deflect at least partially into a plurality of apertures of a body disposed under the upper diaphragm membrane upon venting of pressure from the upper diaphragm membrane. Deflection of the diaphragm membrane opens a fluid pathway between a first valve bore and a second valve bore disposed on the bottom surface of a distribution plate disposed against the upper diaphragm membrane, the first valve bore is positioned adjacent to the second valve bore. The upper diaphragm membrane, first valve bore and second valve bore define a valve.

BRIEF DESCRIPTION OF THE DRAWINGS

The subject-matter of the disclosure will be explained in more detail in the following text with reference to exemplary embodiments which are illustrated in the attached drawings.

FIG. 17B illustrates a cross-sectional perspective view a plumbing arrangement of the unitary distribution plate of FIG. 13.

The reference symbols used in the drawings, and their meanings, are listed in summary form in the list of reference symbols. In principle, identical parts are provided with the same reference symbols in the figures.

DETAILED DESCRIPTION

Figure 1:
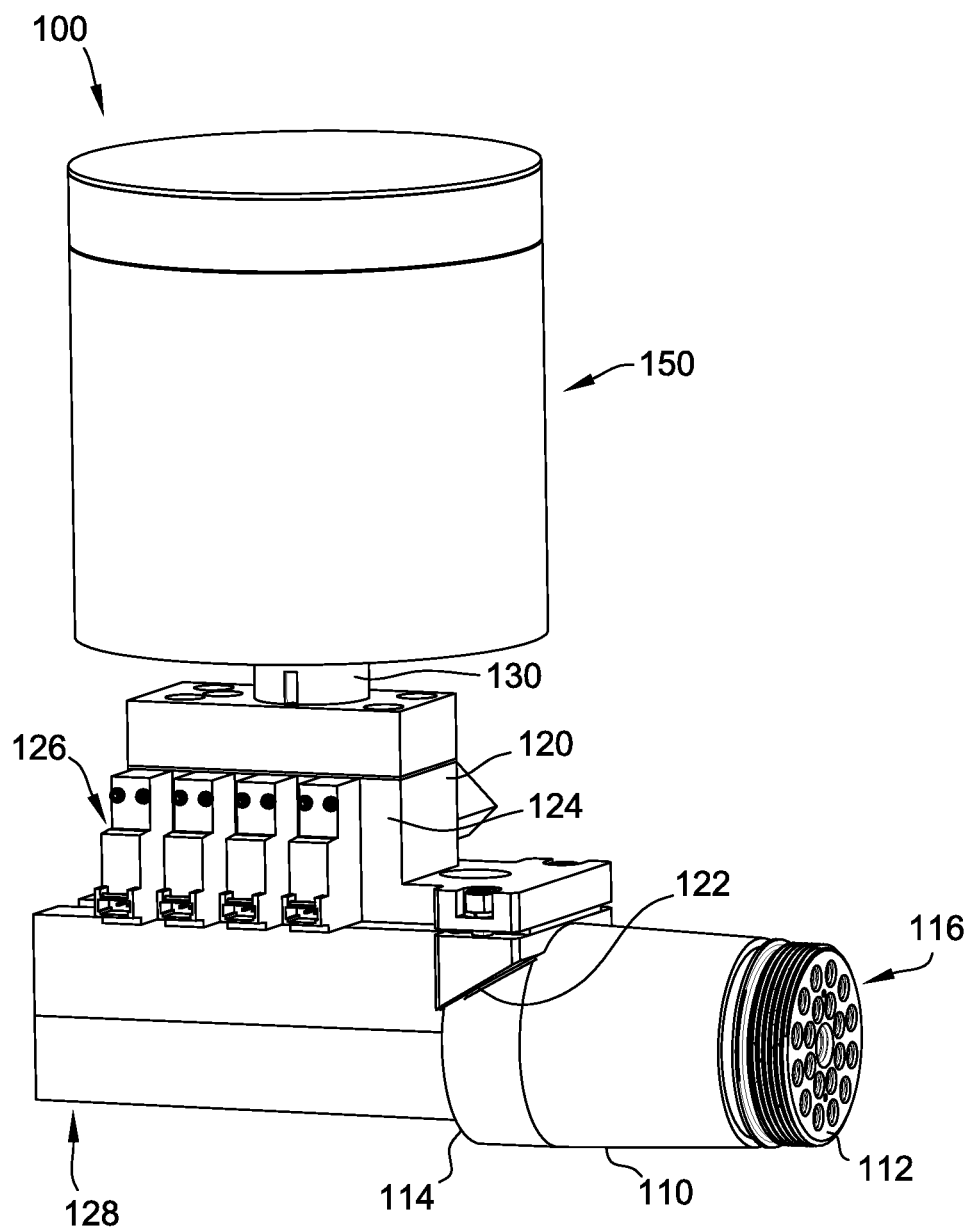
FIG. 1 illustrates a perspective view of a Gas chromatograph (GC) module according to an embodiment of the disclosure.

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

As used herein, the spatial terms "upper," "lower," "top" and "bottom" as used in the present disclosure shall denote a component, or an element of a component, which is upstream or downstream relative to other components and elements of components unless the context clearly dictates otherwise. The term "upper" or "top" shall denote a downstream component or element of a component, and the term "lower" or "bottom" shall denote an upstream component or element of a component. Where a component has a top surface and a bottom surface, the top surface is parallel to the bottom surface. Such relative spatial terms are used only to facilitate description and are not meant to be limiting.

As used herein, the spatial terms "planar," "longitudinal," "across," and "diagonal" as used in the present disclosure shall denote a spatial relationship of an element relative to a surface or plane of a component. The spatial term "radial" as used in the present disclosure shall denote a spatial relationship of an element relative to a surface or plane of a component and an axis perpendicular to the surface or plane of the component. A "radial" element is also planar. Such relative spatial terms are used only to facilitate description and are not meant to be limiting.

As used herein, the term "open" refers to a fluid conduit or fluid pathway in which gas or fluids can flow through uninterrupted. As used herein, the term "closed" describes a fluid conduit in which gas or fluid is interrupted and does not flow.

As used herein, the term "PCB" or "printed circuit board" as used in the present disclosure shall mean a substate to which electronic components are mounted and which conductive pathways or traces disposed on the substrate connect the electronic components.

As used herein, the term "swapped out," "different," "alternative," "replaced" or "modular" shall mean a modular component having alternative elements in accordance with embodiments of the present disclosure. The alternative elements and modular components are compatible with original components, merely changing or altering the exemplary plumbing arrangement as illustrated in the figures. The modular components maintain the functionality of the assemblies and systems disclosed herein, achieving a different plumbing arrangement relative to the exemplary plumbing arrangement as illustrated in the figures.

As used herein, the term "exemplary plumbing arrangement" or "first plumbing arrangement" shall denote a two ten-port valve configuration as illustrated in the figures. Where applicable, alternative plumbing arrangements can have the two ten-port valve configurations with different fluid pathways, or a different valve configuration with different fluid pathways.

Embodiments of the present disclosure are directed to a single, unitary distribution plate of a gas chromatograph (GC) module having a plurality of valve ports and at least one sensor cell provided along the top and bottom surfaces of the unitary distribution plate, and a configurable diaphragm disposed against the bottom surface of the unitary distribution plate for opening or closing the plurality of valve ports. The valve ports and sensor cells are connected by fluid channels within the thickness of the distribution plate. The channels include a combination of planar, longitudinal, diagonal, and radial fluid pathways relative to the top surface of the distribution plate. In an embodiment of the present disclosure the fluid channels are formed by diffusion bonding or more generally laminating multiple plates into the unitary distribution plate. The multiple laminated plates include machined longitudinal, planar, and radial fluid pathways, which when stacked onto one another create internal passages within the thickness of the unitary distribution plate. It should be understood that in other alternate embodiments of the present disclosure the unitary distribution plate may be manufactured using a variety of manufacturing techniques, such as for example metal 3D printing, Direct Metal Laser Sintering (DMLS) and Selective Laser Melting (SLM)

The diaphragm is comprised of two membranes stacked on one another to open and close fluid pathways connecting valve ports. As will be described in greater detail hereinbelow, the diaphragm is configurable such that a fluid pathway between valve ports can be eliminated by modifying the features on the diaphragm and without the need to change the plumbing arrangement of the unitary distribution plate. Thus, the present disclosure eliminates the need for stacked distribution plates and the need for thin film gasketing between multiple distribution plates while reducing system complexity.

The disclosure and figures illustrate plumbing arrangements having a two ten-port valve plumbing arrangement. As understood by a person skilled in the art, the present disclosure can be applied to a single ten-port plumbing arrangement, or more generally a x-number n-port valve configuration, where "n-port valve" denotes a set of valves having an n-number of valves, and "x-number" denotes an x-number of valve sets or pairs.

Figure 2:
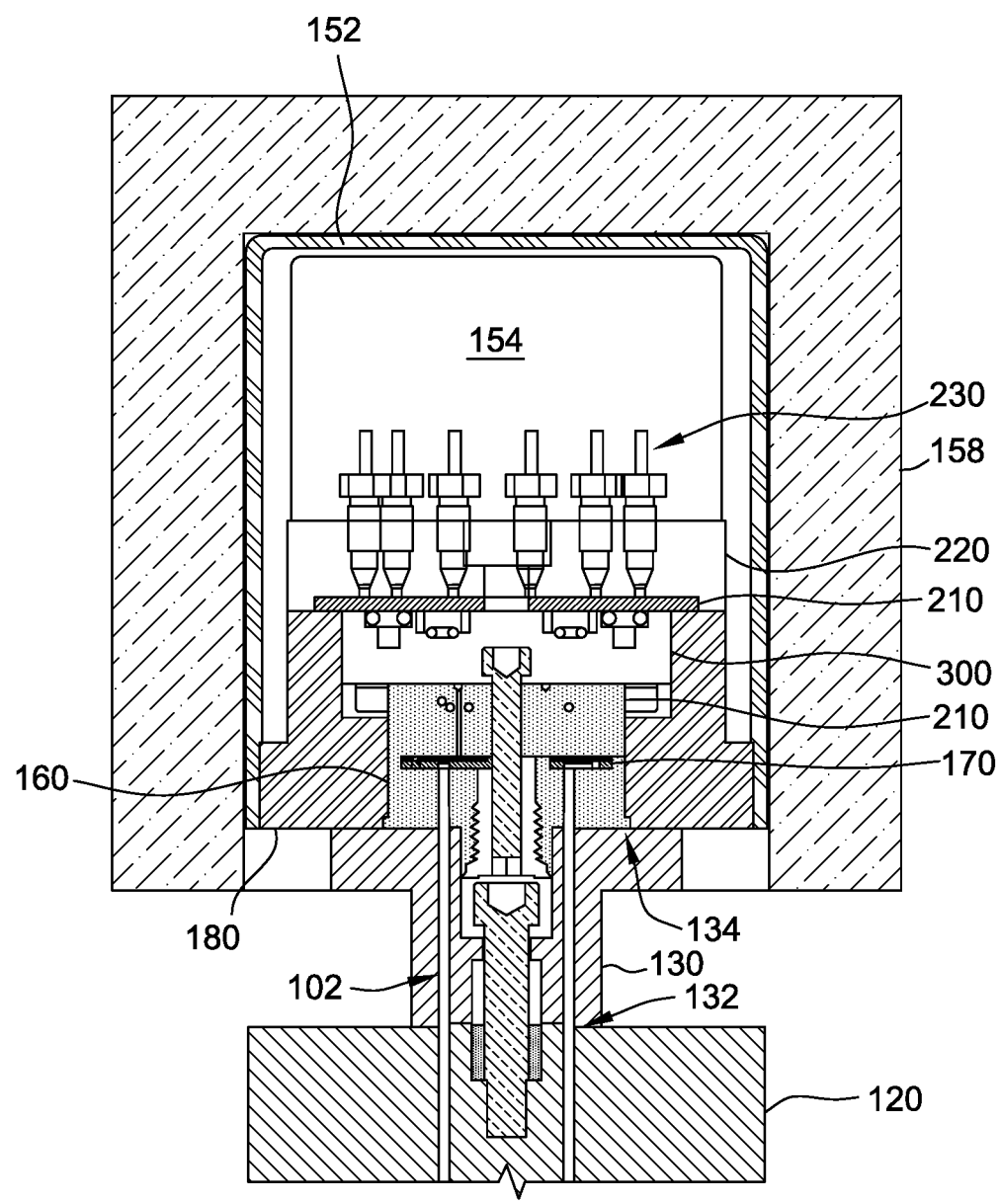
FIG. 2 illustrates a cross-sectional side view of the GC module of FIG. 1.
Figure 6A:
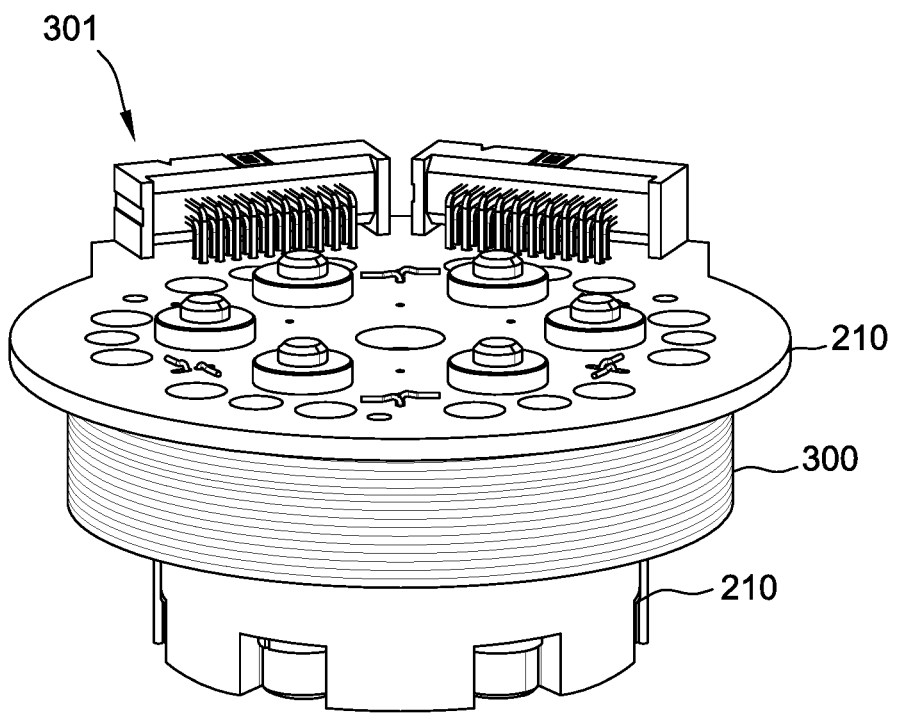
FIG. 6A illustrates a side perspective view of a modular valve subassembly of the GC module of FIG. 1.

Referring to FIGS. 1 and 2, a gas chromatograph (GC) module 100 comprises a gas feed through port 110, a gas distribution manifold 120, a gas distribution insulator 130 which collectively route one or more of an input feed for a carrier gas, at least one input feed for a sample gas, one or more vent ports for venting one or more of the sample gas, carrier gas and pilot gas pressures, and one or more pilot ports (referred to hereinafter as "fluid input/output feeds 102") to a GC oven assembly 150 located downstream from the gas distribution insulator 130. The GC oven assembly 150 comprises an oven enclosure 152 fluidly sealed with a heater plate 180 forming an enclosed environment 154. Within the oven enclosure 152 and enclosed environment 154, the GC oven assembly 150 further comprises a spacer plate 160, and a pilot gasket 170 which route the fluid input/output feeds 102 downstream to a modular valve subassembly 301, shown in FIG. 6A, and to a further downstream column plate 220 and column spooling 230. In some embodiments, the oven enclosure 152 further comprises an outer enclosure 158 surrounding the oven enclosure 152 providing further insulation. In some embodiments, the spacer plate 160 or pilot gasket 170 are comprised of an insulating material.

Figure 6B:
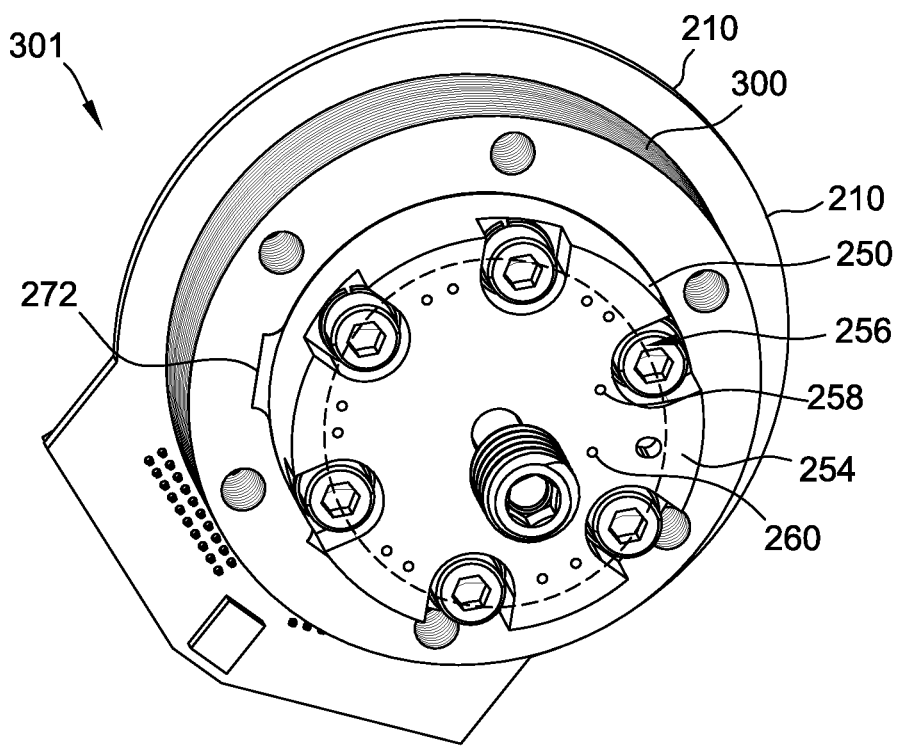
FIG. 6B illustrates a bottom perspective view of the modular valve subassembly of the GC module of FIG. 1.
Figure 6C:
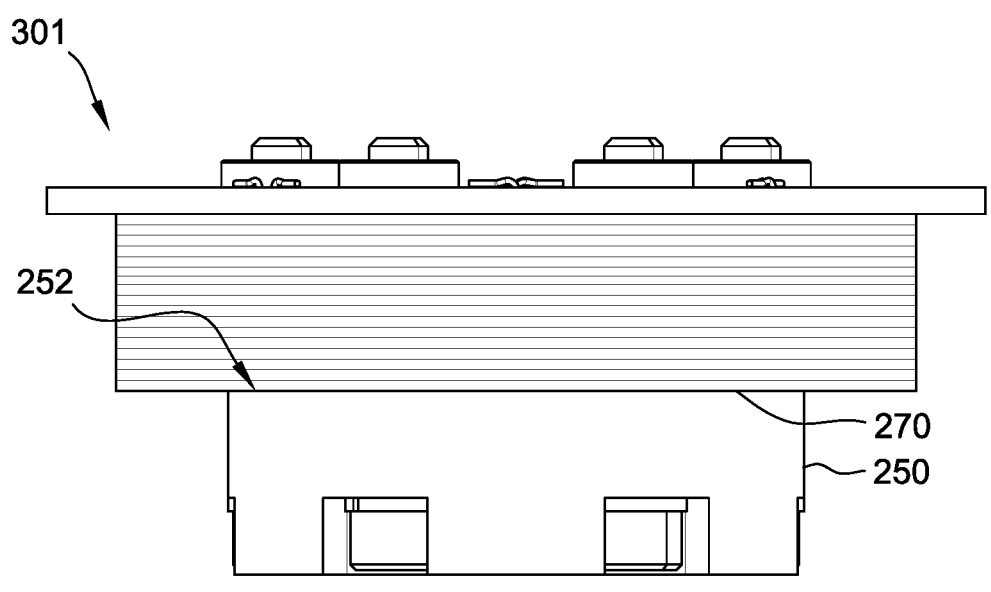
FIG. 6C illustrates a side view of the modular valve subassembly of the GC module of FIG. 1

The modular valve subassembly 301 comprises a pilot plate 250, a diaphragm 270, a unitary distribution plate 300 and a sensor printed circuit board or PCB 210. As explained in further detail below with reference to FIGS. 6A through 6C, when the distribution plate and diaphragm of modular valve subassembly 301 are coupled they define a first plumbing arrangement. The modular valve subassembly 301 simplifies the GC system. If alternative plumbing is required for a specific GC application, a modular valve subassembly 301 can be swapped out as a unit and replaced by an alternative modular valve subassembly having a second plumbing arrangement in accordance with some embodiments. In some embodiments, only the unitary distribution plate 300 is swapped out for a different plumbing arrangement. In some embodiments, only the diaphragm 270 is swapped out in order to provide the required alternate plumbing arrangement. In some embodiments, the diaphragm 270 and unitary distribution plate 300 are swapped out for a diaphragm and distribution plate that enable the required alternate plumbing arrangement. The term "swapped out" as used herein shall mean a modular component of the modular valve subassembly 301 which can be replaced by a different component and maintain the functionality of the modular valve subassembly 301 and the GC module 100 generally to achieve a different plumbing arrangement without having to change non-modular components of the modular valve subassembly 301 and the GC module 100 generally. Removal of modular components diaphragm 270 and unitary distribution plate 300 can be performed in a quick and simple manner without disconnecting the GC module 100 from the system. The exchange is performed by opening the GC oven assembly 150, loosening associated fasteners, removing the modular assembly, and replacing the assembly with a discrete alternate modular valve subassembly 301 having alternative diaphragm 270 and unitary distribution plate 300. The unitary distribution plate 300 is maintained as a unit with well-known fasteners such as nuts and bolts, providing sufficient compression of the components.

Figure 3:
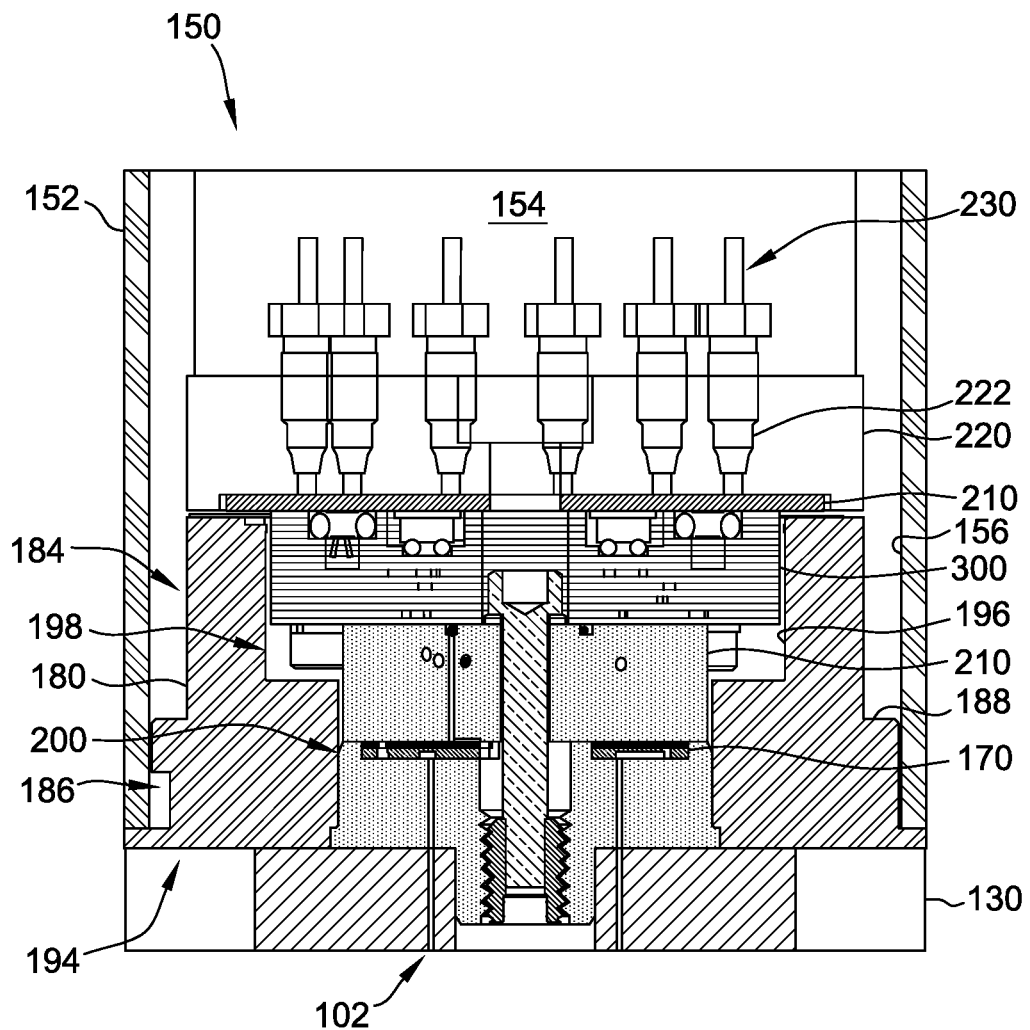
FIG. 3 illustrates a cross-sectional side view of the GC module of FIG. 1.
Figure 4A:
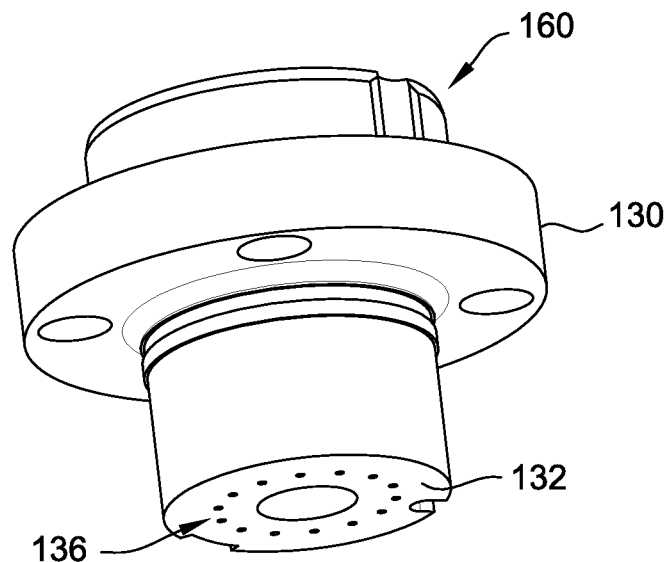
FIG. 4A illustrates a bottom perspective view of a gas distribution insulator of the GC module of FIG. 1.
Figure 4B:
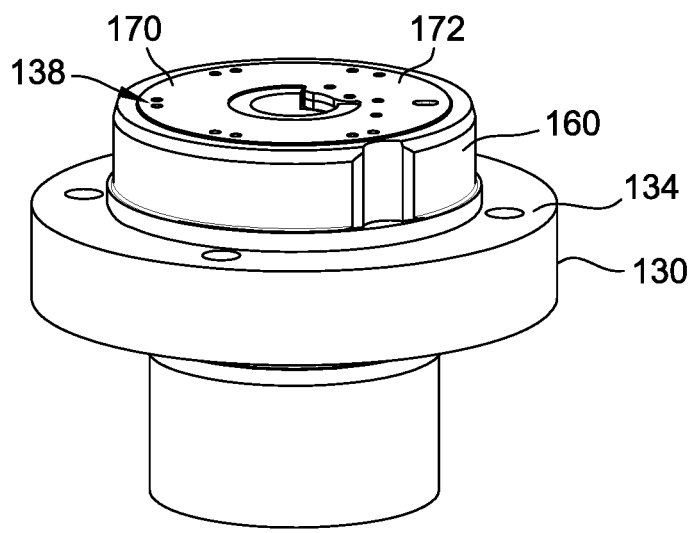
FIG. 4B illustrates a top perspective view of the gas distribution insulator of the GC module of FIG. 1.
Figure 5:
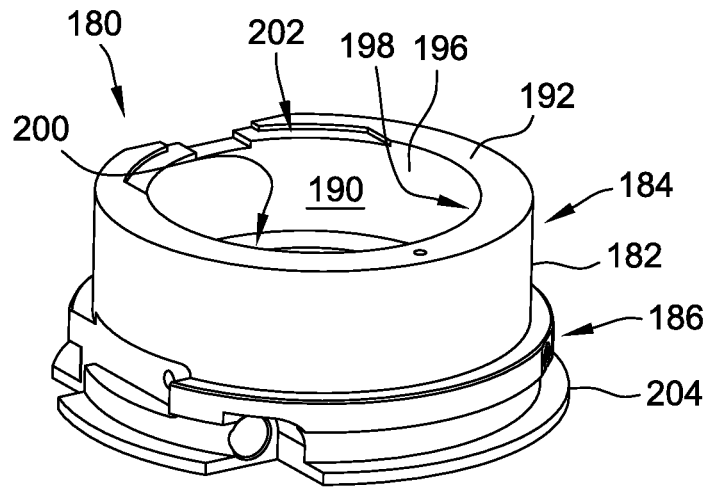
FIG. 5 illustrates a perspective view of a heater plate of the GC module of FIG. 1.

As best shown in FIGS. 1-3, the gas feed through port 110 comprises a first end 112 and a second end 114. A plurality of gas or fluid ports 116 extend through the gas feed through port 110 from the first end 112 to the second end 114. The first end 112 of the gas feed through port 110 connects the GC module 100 to a sampling device or system and the second end 114 connects the gas feed through port 110 to the gas distribution manifold 120.

The plurality of gas or fluid ports 116 include the one or more of the input feed for the carrier gas, at least one input feed for the sample gas, one or more vent ports for venting one or more of the sample gas, carrier gas and pilot gas pressures, and one or more pilot ports. The fluid input/output feeds 102 are routed through components of the GC module 100 for filling or back-flushing the GC module 100, testing and analysing the sample gas, and opening or closing the diaphragm 270 by creating pressure from the pilot gas pressures. Applying pressure will push the diaphragm 270 and close a valve port and venting or releasing pressure opens the valve port as explained in further detail below.

The gas distribution manifold 120 comprises a body having an input end 122 for receiving the second end 114 of the gas feed through port 110 and an output end 124 for routing the fluid input/output feeds 102. In some embodiments, the gas distribution manifold 120 further comprises one or more control modules 126 for opening or closing the one or more of the input feed for the carrier gas and at least one input feed for the sample gas of the fluid input/output feeds 102. In some embodiments, one or more of the control modules 126 are configured to open or close at least one pilot port 258 and at least one pressure vent port 260 of FIG. 6B. In some embodiments, one or more of the control modules 126 are configured as two-way pressure valves for opening or closing of sample gas. In some embodiments, one or more of the control modules 126 are configured as two-way pressure valves for opening or closing of carrier gas. In some embodiments, one or more of the control modules 126 are have built-in venting features to relieve pilot pressure when closing and opening. In some embodiments, the gas distribution manifold 120 further comprises control and testing components 128 for controlling the one or more control modules 126 and for receiving analysed or tested data from the one or more sensors as explained in further detail below.

As shown in FIGS. 2 through 5, the fluid input/output feeds 102 are routed from the gas distribution manifold 120 to the pilot plate 250. In some embodiments, the fluid input/output feeds 102 are routed from the gas distribution manifold 120 to the pilot plate 250 through the gas distribution insulator 130, the spacer plate 160 and the pilot gasket 170. The gas distribution insulator 130, the spacer plate 160 and the pilot gasket 170 each have a substantially cylindrical body and are stacked on one another coaxially, with the gas distribution insulator 130 having a bottom end 132 and a top end 134, the spacer plate 160 abutting the top end 134 of the gas distribution insulator 130, and the pilot gasket 170 abutting the spacer plate. The bottom end 132 of the gas distribution insulator 130 has input ports 136 configured to fluidly connect the fluid input/output feeds 102 received from the gas distribution manifold 120 to output ports 138 located on the top end 134 of the gas distribution insulator 130. In some embodiments, the fluid input/output feeds 102 are extended from the output ports 138 through the spacer plate 160 and through a top surface 172 of the pilot gasket 170 to the pilot plate 250. As best shown in FIGS. 4A and 4B, the spacer plate 160 and pilot gasket 170 are connected to the top end 134 of the gas distribution insulator 130 and the input ports 136 extend from the bottom end 132 to a top surface 172 of the pilot gasket 170. In some embodiments, the spacer plate 160 and pilot gasket 170 are press-fit onto the gas distribution insulator 130, forming a unitary body. The top end 134 of the gas distribution insulator 130 has a diameter that is larger than a diameter of the spacer plate 160 such that the heater plate 180 of the GC oven assembly 150 can be positioned against the top end 134 of the gas distribution insulator 130.

The heater plate 180 comprises a substantially cylindrical body 182 having a top portion 184 and a bottom portion 186. The bottom portion 184 has a larger diameter than the diameter of the top portion 184 forming an outer ledge 188. The outer ledge 188 is sized and configured to form a seal with an inner surface 156 and thereby fluidly seal the oven enclosure 152. The heater plate 180 further comprises an aperture 190 extending coaxially from a top surface 192 to a bottom surface 194 of the heater plate 180. The aperture 190 defines an inner wall 196 having an inner upper portion 198 and an inner lower portion 200, with the inner upper portion 198 having a diameter larger than a diameter of the inner lower portion 200. As best shown in FIG. 2, the diameter of the inner lower portion 200 is configured to receive the spacer plate 160, pilot gasket 170 and at least a portion of the pilot plate 250. The diameter of the inner upper portion 198 is configured to receive the unitary distribution plate 300, with the unitary distribution plate 300 coaxially abutting the pilot plate 250 as explained in further detail below. In some embodiments, a flange 204 extends from the bottom surface 194 of the heater plate 180 and is configured to seal with the oven enclosure 152.

Referring now to FIGS. 3 and 6A through 6C, the pilot plate 250 is positioned below the unitary distribution plate 300 and the sensor PCB 210 is positioned above the unitary distribution plate 300. The diaphragm 270 is positioned between the pilot plate 250 and the unitary distribution plate 300 and is configured to open or close one or more valves formed between the diaphragm 270 and the unitary distribution plate 300 as explained in further detail below. The sensor PCB 210 is positioned above the unitary distribution plate 300 and is configured to receive data from one or more sensors disposed within the unitary distribution plate 300. Where the pilot plate 250 and sensor PCB 210 are configured for the exemplary two ten-port valve configuration, one or both of the diaphragm 270 and unitary distribution plate 300 can be replaced or swapped out for an alternative diaphragm 270 or alternative unitary distribution plate 300 having different fluid pathways for the ten-valve port plumbing arrangement without having to change the pilot plate 250 and sensor PCB 210, or more generally having to change any other component of the modular valve subassembly 301 or the GC module 100.

Referring to FIGS. 6B through 7D, the pilot plate 250 has a generally cylindrical body having a top surface 252 and a bottom surface 254. The pilot plate 250 comprises three distinct rings of ports disposed coaxially on the top surface 252. An outer ring of through ports 256 are configured to distribute one or more of the input feed for the carrier gas, the least one input feed for the sample gas, and the vent port from the gas distribution insulator 130 to the unitary distribution plate 300. The bottom surface 254 of the pilot plate 250 comprises at least one pilot port 258 and at least one pressure vent port 260.

Figure 7A:
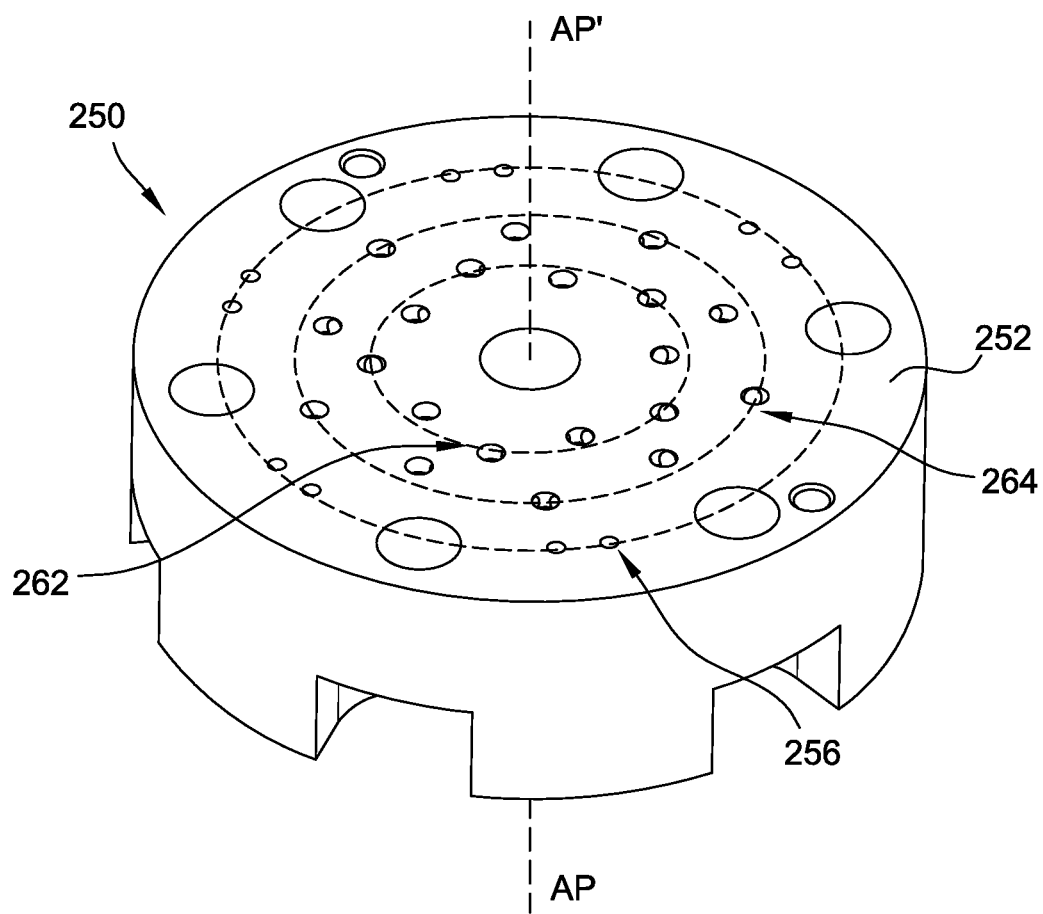
FIG. 7A illustrates a perspective view of a pilot plate of the modular valve subassembly of FIG. 6A.
Figure 7B:
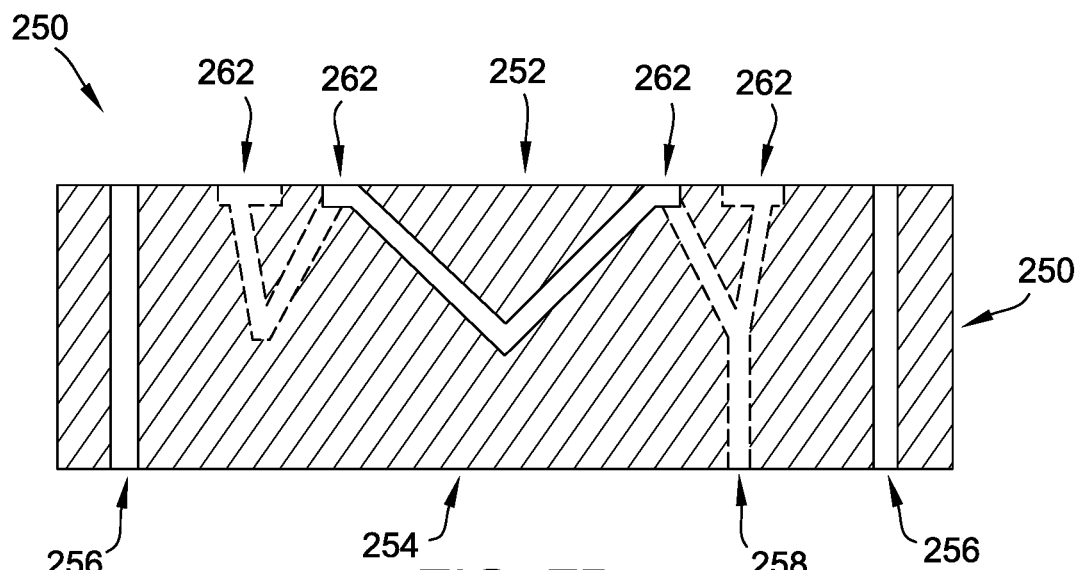
FIG. 7B illustrates a cross-sectional view of the pilot plate of the modular valve subassembly of FIG. 6A.
Figure 7C:
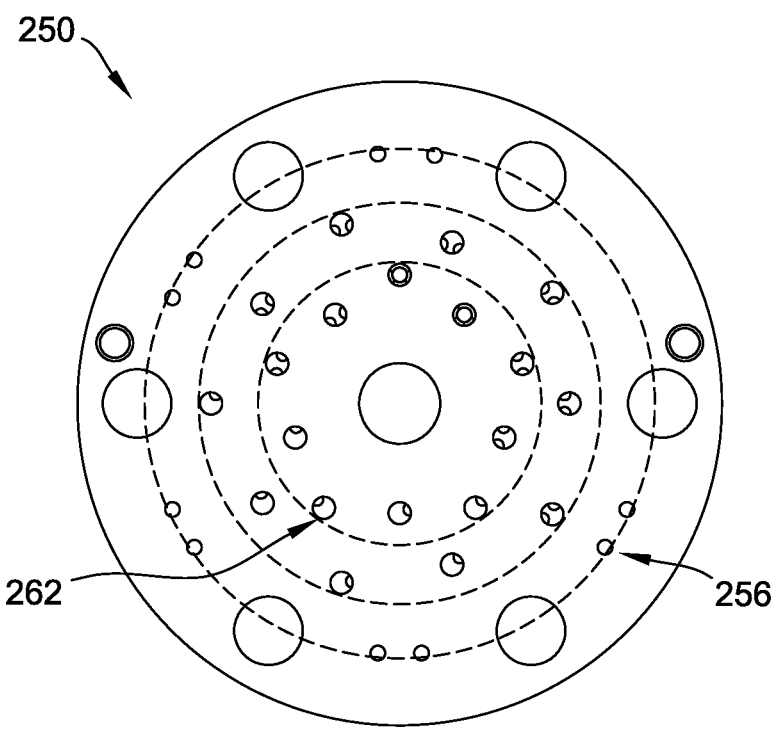
FIG. 7C illustrates a top view of the pilot plate of the modular valve subassembly of FIG. 6A.
Figure 7D:
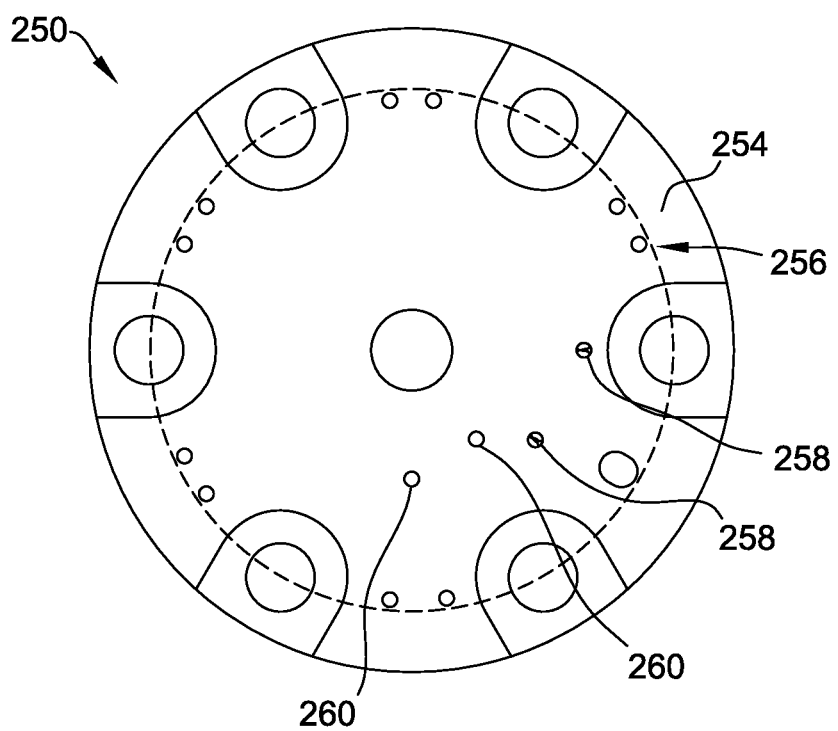
FIG. 7D illustrates a bottom view of the pilot plate of the modular valve subassembly of FIG. 6A.
Figure 8:
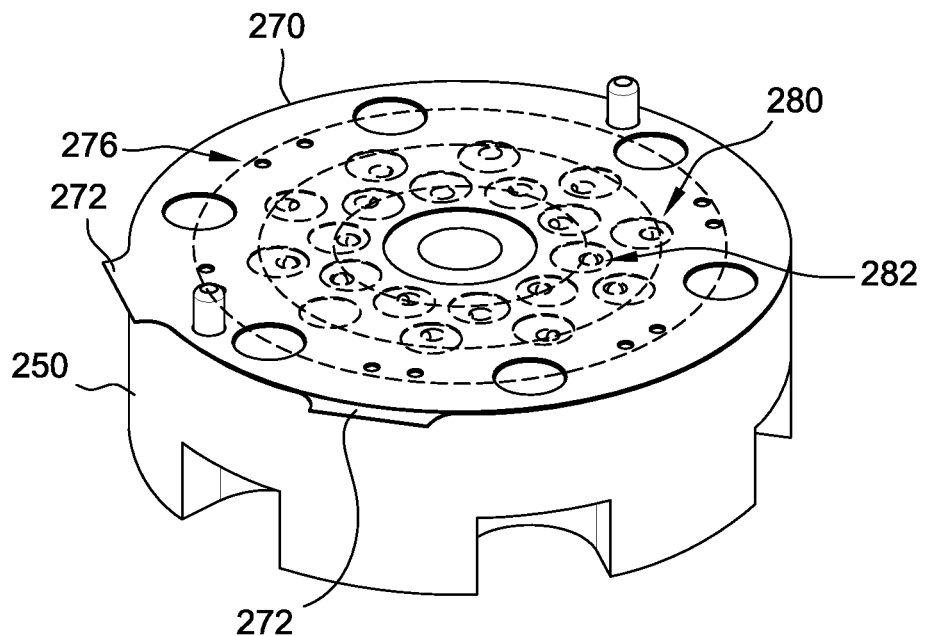
FIG. 8 illustrates a perspective view of the pilot plate and a diaphragm of the modular valve subassembly of FIG. 6A.
Figure 9:
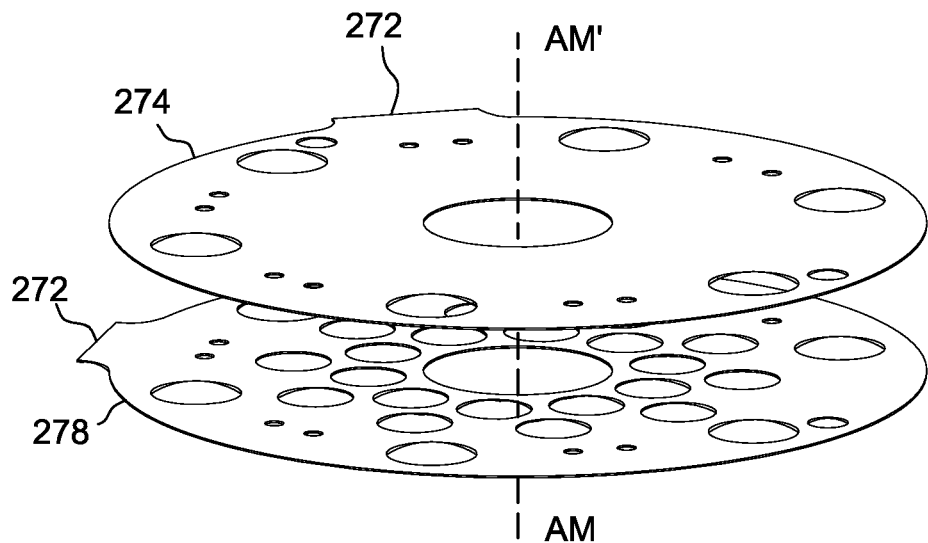
FIG. 9 illustrates an exploded view of the diaphragm of the modular valve subassembly of FIG. 6A.
Figure 10:
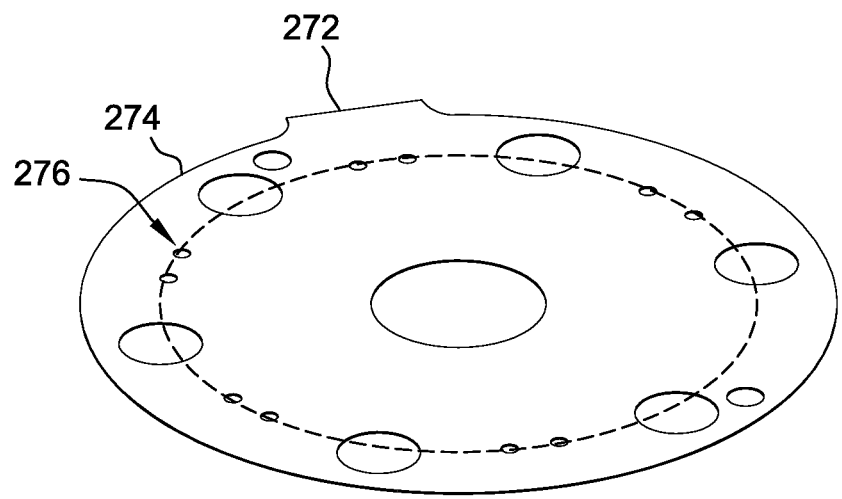
FIG. 10 illustrates a perspective view of an upper diaphragm membrane of the diaphragm of FIG. 9.
Figure 11:
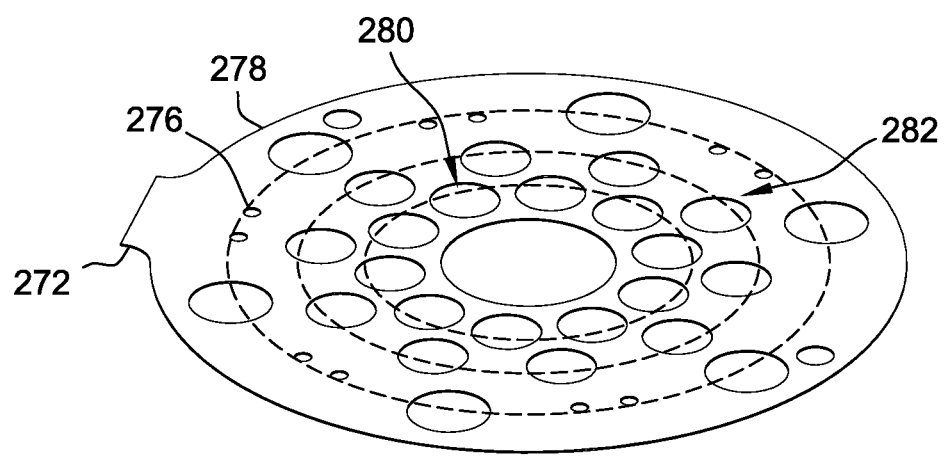
FIG. 11 illustrates a perspective view of a lower diaphragm membrane of the diaphragm of FIG. 9.

As best shown in FIGS. 7A and 7B, a first of the at least one pilot port 258 and a first of the at least one pressure vent port 260 are fluidly connected to an inner ring of valve control holes 262 disposed on the top surface 252. Likewise, a second of the at least one pilot port 258 and a second of the at least one pressure vent port 260 are fluidly connected to an outer ring of valve control holes 262 disposed on the top surface 252 in series. The inner ring of valve control holes 262 are configured as control ports to open or close inner ten-valve ports and the outer ring of valve control holes 262 are configured as control ports to open or close outer ten-valve ports. The inner ring of valve control holes 262 and outer ring of valve control holes 262 are coaxial with a center axis AP of the pilot plate 250. In some embodiments, the outer ring of through ports 256 are also are coaxial with the center axis AP of the pilot plate 250.

As shown in FIGS. 8 through 11, the diaphragm 270 is positioned against the top surface 252 of the pilot plate 250 and is comprised of an upper diaphragm membrane 274 and a lower membrane 278. The upper diaphragm membrane 274 and lower membrane 278 each comprise an outer ring of through ports 276, and tabs 272. The lower membrane 278 comprises an inner ring of apertures 280 and an outer ring of apertures 282. The inner ring of apertures 280 are positioned above the inner ring of valve control holes 262 and the outer ring of apertures 282 are positioned above the outer ring of valve control holes 262. The inner ring of apertures 280 and outer ring of apertures 282 are coaxial with a center axis AM of the diaphragm 270. In some embodiments, the outer ring of through ports 276 are also are coaxial with the center axis AM of the of the diaphragm 270. The upper diaphragm membrane 274 is configured to deflect downward into the inner ring of apertures 280 and outer ring of apertures 282 upon venting of pressure from the at least one pressure vent port 260 to the upper diaphragm membrane 274 from the inner ring of valve control holes 262 and the outer ring of valve control holes 264 of the pilot plate 250. In some embodiments, the upper diaphragm membrane 274 is configured to deflect at least partially into a plurality of apertures of a body disposed under the upper diaphragm 274 membrane upon venting of pressure from the upper diaphragm membrane 274. In some embodiments, the upper diaphragm membrane 274 is configured to deflect at least partially into the valve control holes 262 of the pilot plate 250 venting of pressure from the upper diaphragm membrane 274.

Figure 12:
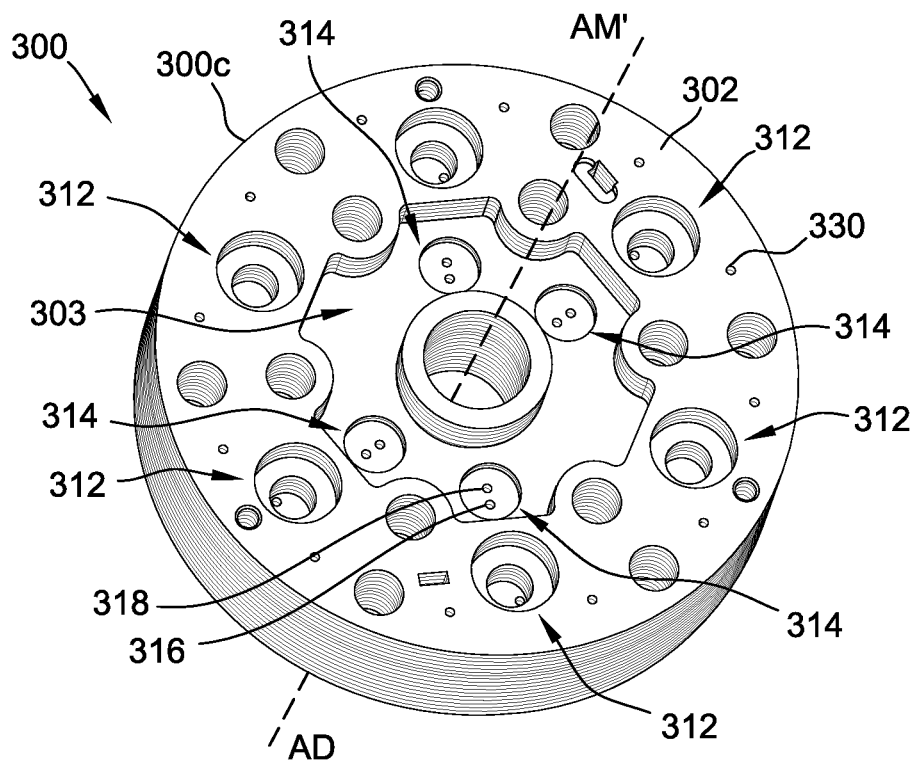
FIG. 12 illustrates a perspective view of a unitary distribution plate of the modular valve subassembly of FIG. 6A in accordance with one or more embodiments.
Figure 13:
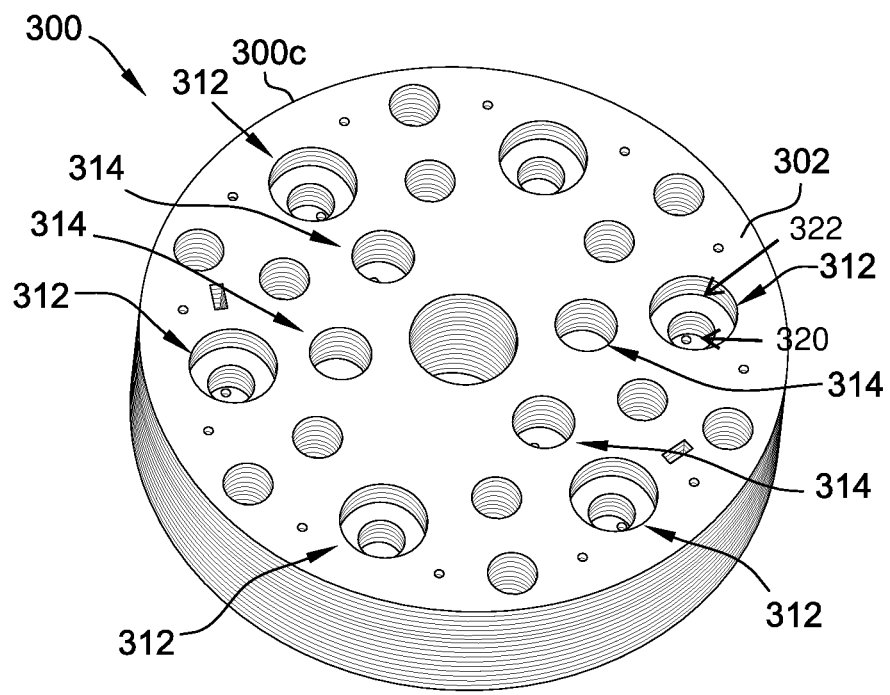
FIG. 13 illustrates a perspective view of a unitary distribution plate of the modular valve subassembly of FIG. 6A in accordance with one or more embodiments.
Figure 14:
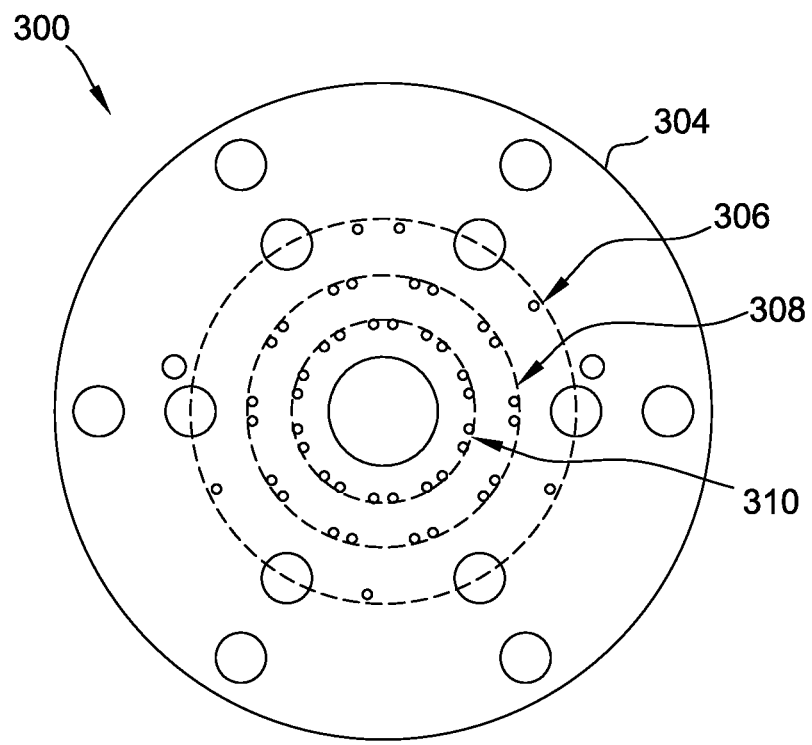
FIG. 14 illustrates a bottom view of the unitary distribution plate of FIG. 13.
Figure 15:
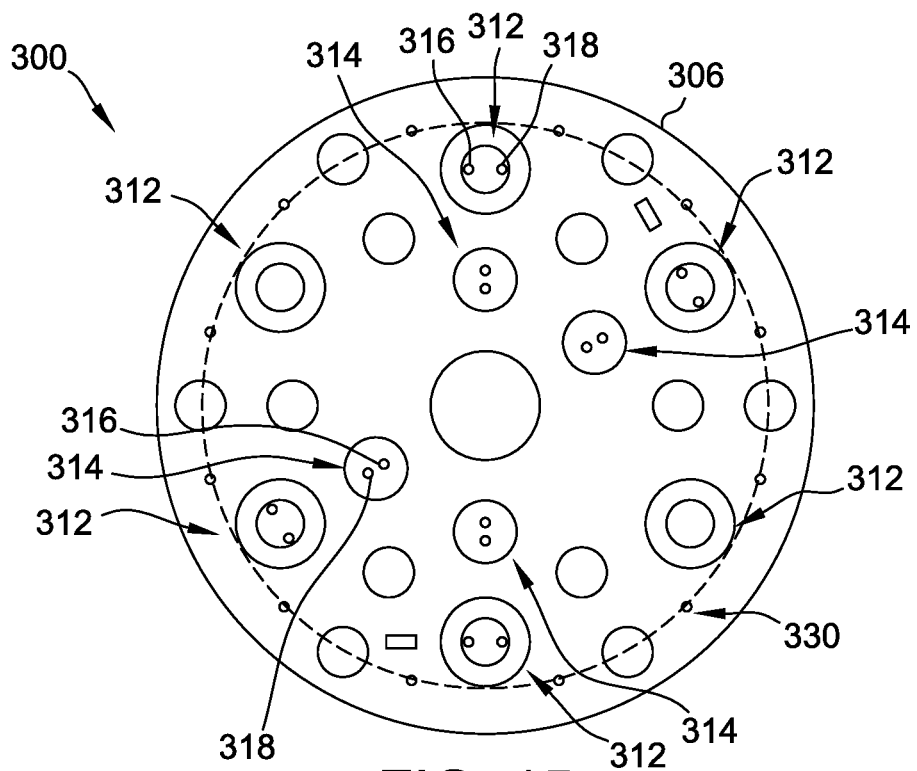
FIG. 15 illustrates a top view of the unitary distribution plate of FIG. 13.

As shown in FIGS. 12 through 15, the unitary distribution plate 300 comprises a top surface 302 and a bottom surface 304 defining a thickness. As best shown in FIG. 14, the bottom surface comprises an outer ring of sample and carrier gas bores 306, an inner ring of valve bores 308 and an outer ring of valve bores 310. In some embodiments, the inner ring of valve bores 308 and an outer ring of valve bores 310 are coaxial with a center axis DM of the unitary distribution plate 300. In some embodiments, the outer ring of sample and carrier gas bores 306 are also are coaxial with the center axis AD of the of the unitary distribution plate 300. Fluid input/output feeds 102 from the gas distribution insulator 130 of FIGS. 4A and 4B having passed through the outer ring of through ports 256 of the pilot plate 250 and the outer ring of through ports 276 of the diaphragm 270 fluidly deliver one or more of the input feed for a carrier gas, at least one input feed for a sample gas and to the outer ring of sample and carrier gas bores 306.

As explained in further detail below, during an injection or backflush process, valves formed between the diaphragm 270 and adjacent pairs of valve bores of either the inner ring of valve bores 308 and the outer ring of valve bores 310 open or close fluid pathways of the outer ring of sample and carrier gas bores 306 of the unitary distribution plate 300. Application of pressure closes the upper diaphragm membrane 274 and venting of the pressure opens the upper diaphragm membrane 274.

As best shown in FIGS. 12-15, the top surface 302 of the unitary distribution plate 300 comprises a plurality of apertures (312, 314, 330) extending at least partially into the thickness of the unitary distribution plate 300. In some embodiments, the plurality of apertures (312, 314) include at least one sensor cell aperture 314 and at least one detector cell 312 machined into the top surface 302 and extending partially into the top surface 302. In some embodiments, the plurality of apertures (312, 314, 330) extend partially into the thickness of the unitary distribution plate 300 from the bottom surface 304.

Each of the at least one sensor cell aperture 314 and at least one detector cell 312 comprise an inlet bore 316 and an outlet bore 318. The inlet bore 316 and outlet bore 318 are configured to cycle either carrier gas or a sample through the at least one sensor cell aperture 314 and at least one detector cell 312. In some embodiments, the each of the at least one detector cell 312 comprises an inner aperture 320 and an outer aperture 322 (see FIG. 13). The at least one sensor cell aperture 314 comprises a sensor module (not shown) disposed within the aperture. In some embodiments, a gasket (not shown) is positioned between the sensor module and the at least one sensor cell aperture 314. The at least one detector cell 312 comprises a detector module (not shown) disposed within the outer aperture 322. In some embodiments, a gasket (not shown) surrounds the detector module. In some embodiments, the at least one sensor cell aperture 314 and the least one detector cell 312 are sized and configured to receive the sensor module or the detector module. The plurality of apertures 330 (see FIG. 12) further include a ring of GC column ports 330 disposed on the top surface 302 of the unitary distribution plate 300. The ring of GC column ports 330 are in fluid communication with spooling fittings 222 disposed on the column plate 220 (see FIG. 3), which are configured as inlets and outlets for the ring of GC column ports 330.

Figure 16A:
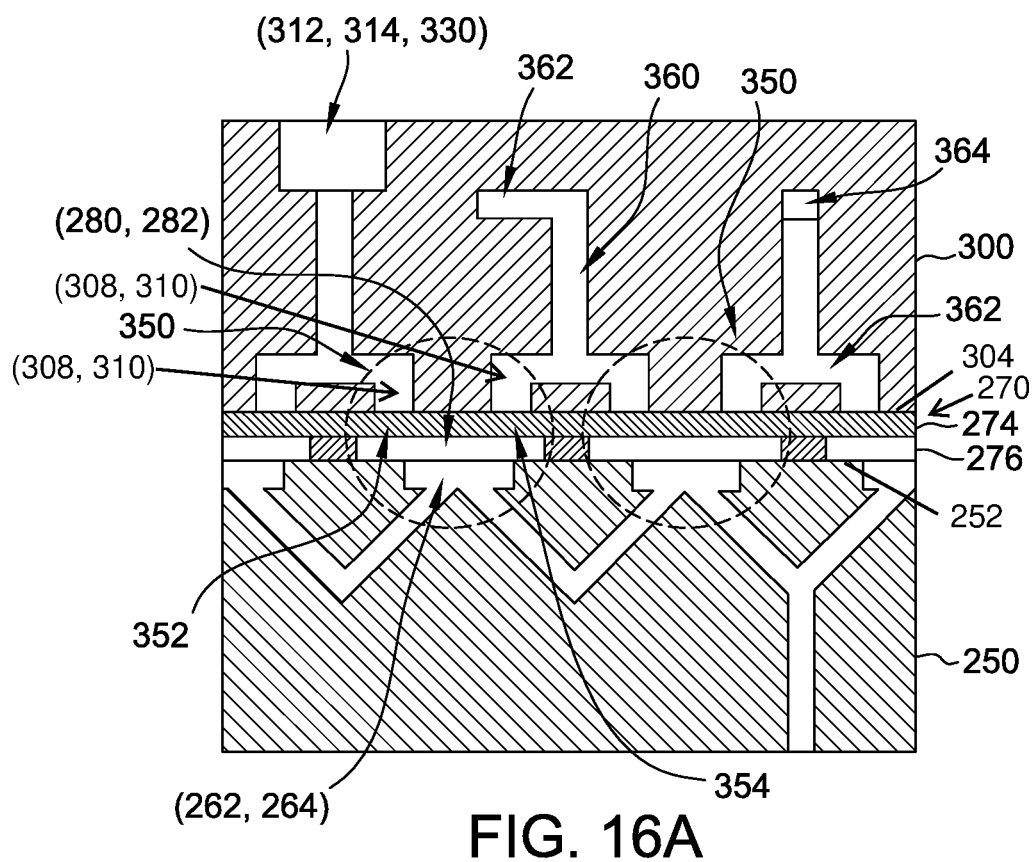
FIG. 16A illustrates a schematic representation of a valve formed by the pilot plate, diaphragm, and unitary distribution plate of the modular valve subassembly of FIG. 6A.
Figure 16B:
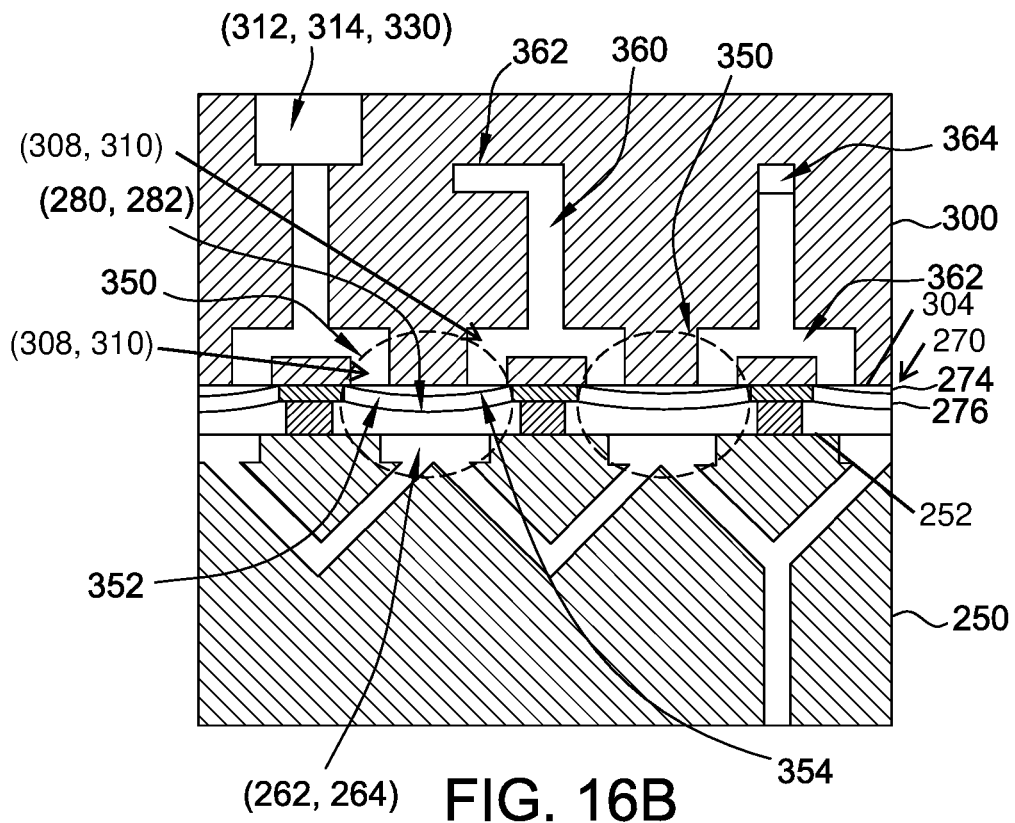
FIG. 16B illustrates a schematic representation of a valve formed by the pilot plate, diaphragm, and unitary distribution plate of the modular valve subassembly of FIG. 6A.

FIGS. 16A and 16B illustrate a schematic cross-section of the pilot plate 250, diaphragm 270 and unitary distribution plate 300 stacked such that the diaphragm 270 is disposed against the top surface 252 of the pilot plate 250, and the bottom surface 304 of the unitary distribution plate 300 abuts the diaphragm 270. Valve control holes of the inner ring of valve control holes 262 or outer ring of valve control holes 264 disposed on the pilot plate 250 are coaxially aligned with apertures of the inner ring of apertures 280 or outer ring of apertures 282 of the diaphragm 270. The valve control holes of the pilot plate 250 and the apertures of the diaphragm are positioned between adjacent valve bores of the inner ring of valve bores 308 or outer ring of valve bores 310 of the unitary distribution plate 300. In the two ten-valve port plumbing arrangement, the inner ring of valve control holes 262 of the pilot plate 250 are aligned with the inner ring of apertures 280 of the diaphragm 270 and adjacent valve bores of the inner ring of valve bores 308 of the unitary distribution plate 300. Likewise, the outer ring of valve control holes 264 of the pilot plate 250 are aligned with the outer ring of apertures 282 of the diaphragm 270 and adjacent valve bores of the outer ring of valve bores 310 of the unitary distribution plate 300.

As schematically represented, valves 350 are defined by a first valve bore 352 and an adjacent second valve bore 354 and the upper diaphragm membrane 274. In FIG. 16A, the valves 350 are closed such that fluid or gas does not flow between the first valve bore 352 and the second valve bore 354. Upon venting of pressure from the valve control holes (262, 264) of the pilot plate 250, the upper diaphragm membrane 274 deflects at least partially into the apertures (280, 282) of the lower diaphragm membrane 278, creating a flow path between the first valve bore 352 and the second valve bore 354, opening the valves 350. Opening and closing of the valves 350 allows for carrier gas or sample gas to flow into fluid pathways disposed within the thickness of the unitary distribution plate 300.

One or more valves 350 can be permanently closed or eliminated by replacing the lower diaphragm membrane 278 with a second lower diaphragm membrane having one or more less apertures (280, 282). A permanently closed valve 350 also permanently closes a downstream fluid pathway, effectively changing the plumbing arrangement without having to swap or replace any other element or component of the pilot plate 250, unitary distribution plate 300, modular valve subassembly 301 or more generally the GC module 100.

The fluid pathways within the thickness of the unitary distribution plate 300 fluidly connect the valves 350 to one or more of adjacent valves 350, sensor cell apertures 312, detector cells 314, ring of GC column ports 330, carrier gas inlets, sample inlets and vent ports depending on a plumbing arrangement. As explained in further detail below, the fluid pathways within the thickness of the unitary distribution plate 300 include longitudinal fluid pathways 360, planar fluid pathways 362 and radial fluid pathways 364. The terms "longitudinal" and "planar" are in relation to the top surface 302 of the unitary distribution plate 300 and the term "radial" is relation to the center axis AD of the unitary distribution plate 300 of the as shown in FIG. 12.

Forming a valve between the diaphragm 270 and the bores of the unitary distribution plate 300 eliminates the need to machine complex valve features into the unitary distribution plate 270. Conventional valves utilize actuators, pistons, multiple diaphragms, and mechanical translation of distribution plates to open or close a valve or a fluid pathway. Eliminating fluid pathway of the present disclosure merely requires changing of the diaphragm 270 having less apertures instead of having to replace multiple components. Diaphragms 270 can be produced in high volumes for less cost as the features of the membranes of the diaphragm 270 can be stamped-out and mass produced, resulting in a low cost, easily replicable and configurable diaphragm 270. In some embodiments, the diaphragm 270 is made from coated or uncoated KAPTON® or polyimide, elastomers, coated 316 stainless steel or CHEMFILM® DF100.

FIGS. 17A, 18A, 19A and 20A illustrate cross-sections of the unitary distribution plate 300 and FIGS. 17B, 18B, 19B and 20B illustrate respective flow paths of the unitary distribution plate 300 for a first plumbing arrangement for a two ten-port valve configuration. The first plumbing arrangement comprises fluid pathways located within the thickness of the unitary distribution plate 300 which fluidly connect the inner ring of valve bores 308 and outer ring of valve bores 310 to one or more of adjacent valves 350, sensor cell apertures 312, detector cells 314, ring of GC column ports 330, carrier gas inlets, carrier sample inlets and a vent port. An exemplary plumbing arrangement for a two ten-port valve system is illustrated and explained in further detail below with reference to FIG. 21.

Figure 17A:
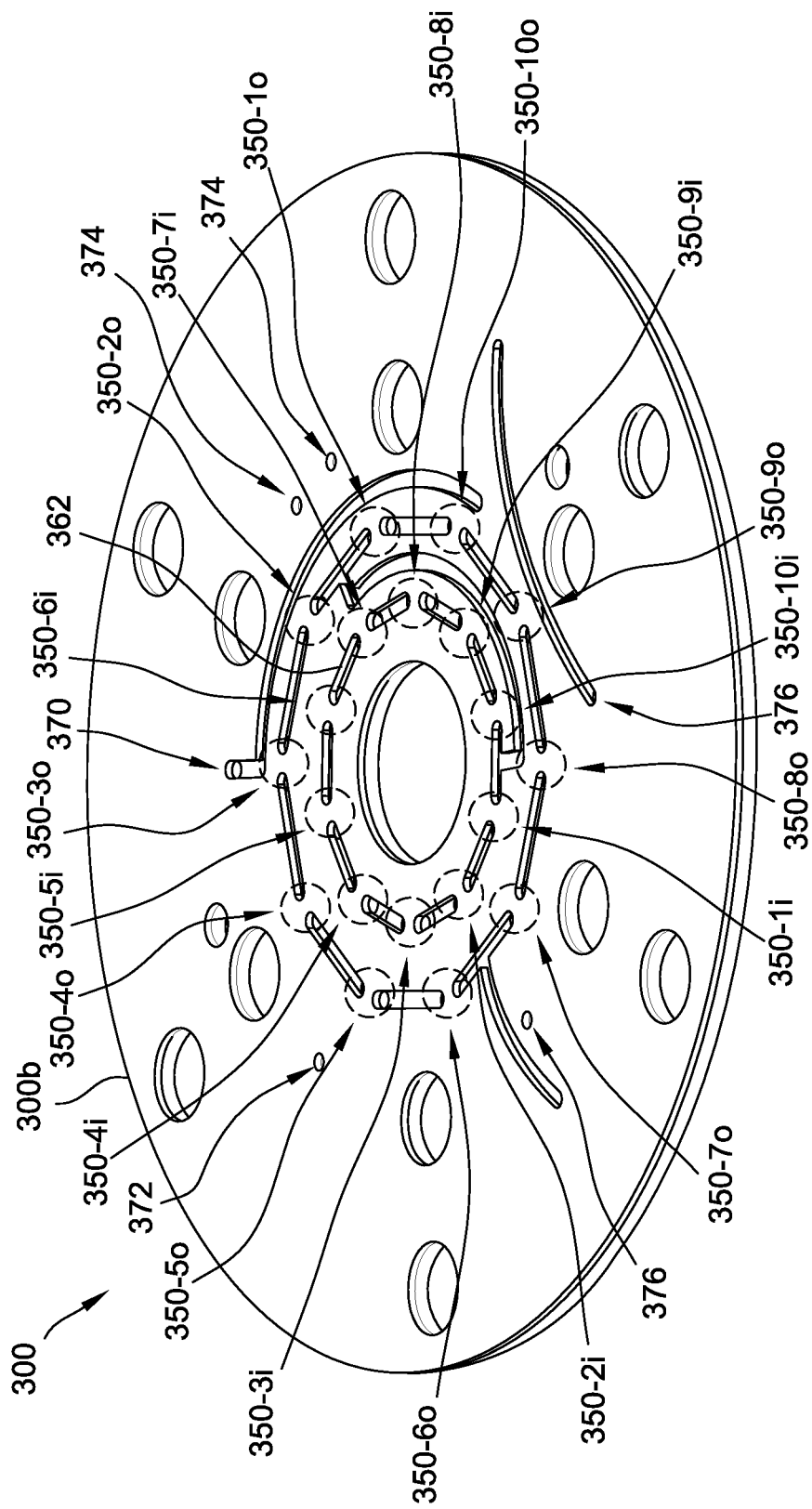
FIG. 17A illustrates a cross-sectional perspective view of the unitary distribution plate of FIG. 13.

As shown in FIGS. 17A and 17B, the inner ring of valve bores 308 form ten valves 350-1$i$, 350-2$i$, 350-3$i$, 350-4$i$, 350-5$i$, 350-6$i$, 350-7$i$, 350-8$i$, 350-9$i$, 350-10$i$ and the outer ring of valve bores 310 form ten valves 350-1$o$, 350-2$o$, 350-3$o$, 350-4$o$1, 350-5$o$, 350-6$o$, 350-7$o$, 350-8$o$, 350-9$o$, 350-10$o$ for the first plumbing arrangement of two ten-port valves. In some embodiments, an alternative or second plumbing arrangement of two ten-port valves comprises a unitary distribution plate having the same number of valves as in illustrated figures and different fluid pathways downstream from the inner ring of valve bores 308 and outer ring of valve bores 310 to one or more of adjacent valves 350, sensor cell apertures 314, detector cells 312, ring of GC column ports 330, carrier gas inlets, sample inlets and vent port. In some embodiments, a third plumbing arrangement of a single ten-port valve comprises a unitary distribution plate having either the inner ring of valve bores 308 or the outer ring of valve bores 310. The diaphragm 270 can be used interchangeably for the first plumbing arrangement, second plumbing arrangement and the third plumbing arrangements because the relative position of the valve bores have not changed in relation to adjacent valve bores. Where the relative positions of the valves 350 do not change, the pilot plate 250, modular valve subassembly 301 and more generally the GC module 100 are not swapped out. Thus, a different plumbing arrangement can be implemented by swapping out or changing either or both of the diaphragm 270 and the unitary distribution plate 300.

One or more valve 350 can be permanently closed or eliminated by replacing the lower diaphragm membrane 278 with a second lower diaphragm membrane having one or more less apertures (280, 282) of FIGS. 6 through 11. A permanently closed valve 350 also permanently closes a downstream fluid pathway, effectively changing the plumbing arrangement without having to swap or replace any other element or component of the pilot plate 250, unitary distribution plate 300, modular valve subassembly 301 or more generally the GC module 100.

Referring to FIGS. 17A and 17B, planar fluid pathways 362 fluidly connect bores of the inner ring of valve bores 308 to adjacent bores of the inner ring of valve bores 308. Planar fluid pathways 362 also fluidly connect bores of the outer ring of valve bores 310 to adjacent bores of the outer ring of valve bores 310. The planar fluid pathways 362 extend across and within the thickness of the unitary distribution plate 300 and are connected to each of the valve bores by a longitudinal fluid pathway 360 extending from the valve bores to the planar fluid pathways 362. In some embodiments, a radial fluid pathway 364 fluidly connects a first outer valve 350-10 fluidly connected to a tenth inner valve 350-10$i$ such that the inner ring of valve bores 308 are fluidly connected to the outer ring of valve bores 310. In some embodiments, a first carrier gas inlet 370, a second carrier gas inlet 372, a sample inlet 374 and a vent port 376 extend from the outer ring of through ports 256 of the pilot plate 250 and the outer ring of through ports 276 of the diaphragm 270 (see FIG. 8) into the thickness of the unitary distribution plate 300.

As shown in FIGS. 17A through 20B, the first carrier gas inlet 370, the second carrier gas inlet 372, the sample inlet 374 and the vent port 376 extend from longitudinal fluid pathway 360 disposed in the thickness of the unitary distribution plate 300 and are fluidly connected one or more of valves 350, at least one sensor cell aperture 314 and at least one GC column port 330. In some embodiments, an eight inner valve 350-8i is fluidly connected to the first carrier gas inlet 370, an eighth outer valve 350-8o is fluidly connected to the second carrier gas inlet 372, a first inner valve 350-1i is fluidly connected to the sample inlet 374 and a tenth outer valve 350-10o is fluidly connected to the vent port 376. The connections of the ten valves 350-1i, 350-2i, 350-3i, 350-4i, 350-5i, 350-6i, 350-7i, 350-8i, 350-9i, 350-10i, the outer ring of valve bores 310 form ten valves 350-1o, 350-2o, 350-3o, 350-4o, 350-5o, 350-6o, 350-7o, 350-8o, 350-9o, 350-10o, the first carrier gas inlet 370, the second carrier gas inlet 372, the sample inlet 374 and the vent port 376 are fluidly connected to one another in the first plumbing arrangement as shown in FIG. 21, and the fluid connections between the aforementioned elements are made through a combination of one or more of longitudinal fluid pathways 360 planar pathways 362 radial fluid pathways 364 as illustrated in FIGS. FIGS. 17A through 20B.

Figure 21:
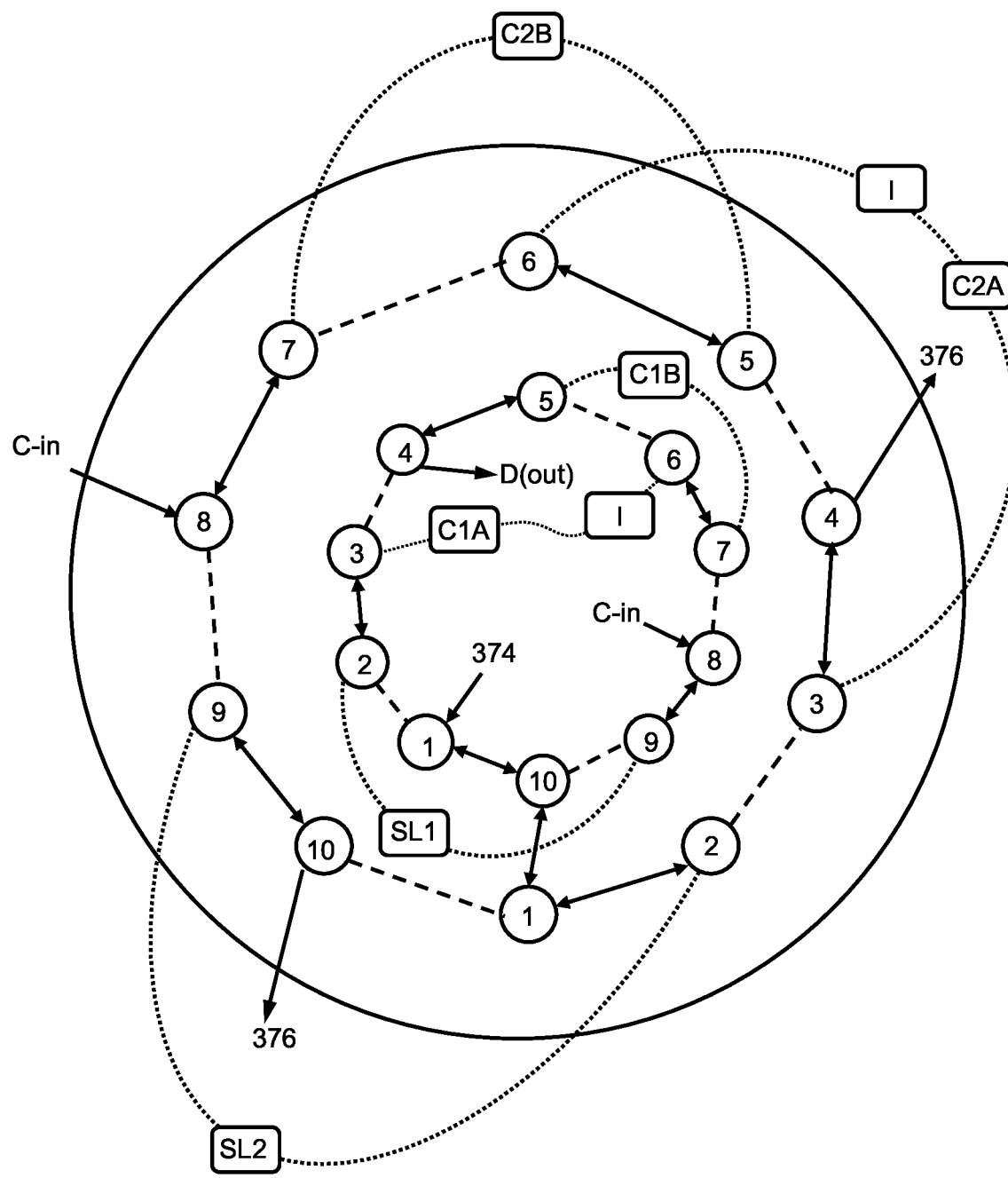
FIG. 21 illustrates a schematic representation of a plumbing arrangement of the GC module of FIG. 1 in accordance with one or more embodiments of the present disclosure; and, FIG. 22 illustrates a detailed view of layers of an exemplary distribution plate in accordance with one or more embodiments of the present disclosure.

FIG. 21 illustrates a schematic representation of the first plumbing arrangement. Venting of pressure from a first of the at least one pilot port 258 and the at least one pressure vent port 260 opens fluid pathways between inner valves 350-4i and 350-5i, 350-6i and 350-7i, 350-8i and 350-9i, 350-1i and 10i, 350-2i and 350-3i, as well as outer valves 350-1o and 350-2o, 350-3o and 350-4o, 350-5o and 350-6o, 350-7o and 350-8o, and 350-9o and 350-10o. Venting of pressure from a second of the at least one pilot port 258 and the at least one pressure vent port 260 closes the fluid pathways of the first of the at least one pilot port 258 and opens fluid pathways between the inner valves 350-1i and 350-2i, 350-3i and 350-4i, 350-5i and 350-6i, 350-7i and 350-8i, 350-9i and 350-9i, as well as outer valves 350-2o and 350-3o, 350-4o and 350-5o, 350-6o and 350-7o, 350-8o and 350-9o, and 350-10o and 350-1o. In the first plumbing arrangement either the valves of the first of the at least one pilot port 258 or the or the second of the at least one pilot port 258 are open or closed, but not both. In one or more embodiments, the valves of the first of the at least one pilot port 258 and the valves of the second of the at least one pilot port 258 are selectively and independently opened or closed.

For the first plumbing arrangement, the following fluid connections are made with a combination of longitudinal fluid pathways 360, planar pathways 362 and radial fluid pathways 364: valve 350-1i is fluidly connected to the sensor cell (of sensor cell aperture 314) or the outer series of valves (via pathway 360); valve 350-2i is fluidly connected to a first sensor cell or sample loop SL1; valve 350-3i is fluidly connected to a first column port C1A or sample loop SL1; valve 350-4i is fluidly connected to a first vent port 376 or to first column port C1A; valve 350-5i is fluidly connected to a vent port or second column port C1B; valve 350-6i is fluidly connected to the first column port C1A or to the second column port C1B; valve 350-7i is fluidly connected to the second column port C1B or the first column port C1A; valve 350-8i is fluidly connected to the first carrier gas inlet 370 or to the second column port C1B; valve 350-9i is fluidly connected to the first 1 sample loop SL1 or to a carrier gas inlet; and valve 350-10i is fluidly connected to sample loop SL1 or the outer series of valves (via pathway 360). The following fluid connections are also made with a combination of longitudinal fluid pathways 360, planar pathways 362 and radial fluid pathways 364: valve 350-1o is fluidly connected to the inner series of valves (via pathway 360) or sample loop SL2; valve 350-2o is fluidly connected to a second sample loop SL2 or C2A; valve 350-3o is fluidly connected to a third column port C2A or Detector 2 vent; valve 350-4o is fluidly connected to a detector 2 vent port 376 or column port C2B; valve 350-5o is fluidly connected to a fourth column port C2B or column port C2A; valve 350-6o is fluidly connected to the third column port C2A; valve 350-7o is fluidly connected to the fourth column port C2B or column port C2A; valve 350-8o is fluidly connected to a second carrier gas inlet 370 or column port C2B; valve 350-90 is fluidly connected to the second carrier gas inlet (sensor cell) or sample loop SL2; valve 350-10o is fluidly connected to a sample loop SL2 or sample vent. The spooling loops are formed by the column spooling 230 of FIG. 2 and are external to the unitary distribution plate 300. The spooling loops increase residence times of the sample gas in the unitary distribution plate 300, thereby improving the heating of the sample gas.

The unitary distribution plate 300 is formed by stacking multiple metal plates having machined features such as the bores, fluid pathways and apertures of the present disclosure. The features are aligned between stacked plates such that the fluid pathways of the present disclosure are formed within the thickness of the unitary distribution plate 300. The stacked plates are diffusion bonded such that the stacked plates are formed into a unitary body having the aforementioned fluid pathways. Due to the unitary distribution plate 300 being a unitary body, gasketing is not required between pathways, thus reducing the complexity of the GC module 100. In some embodiments, the unitary distribution plate 300 is formed by metal MIM injection molding. In some embodiments, the pathways have a diameter between ⌀0.032"-⌀0.016".

Figure 18A:
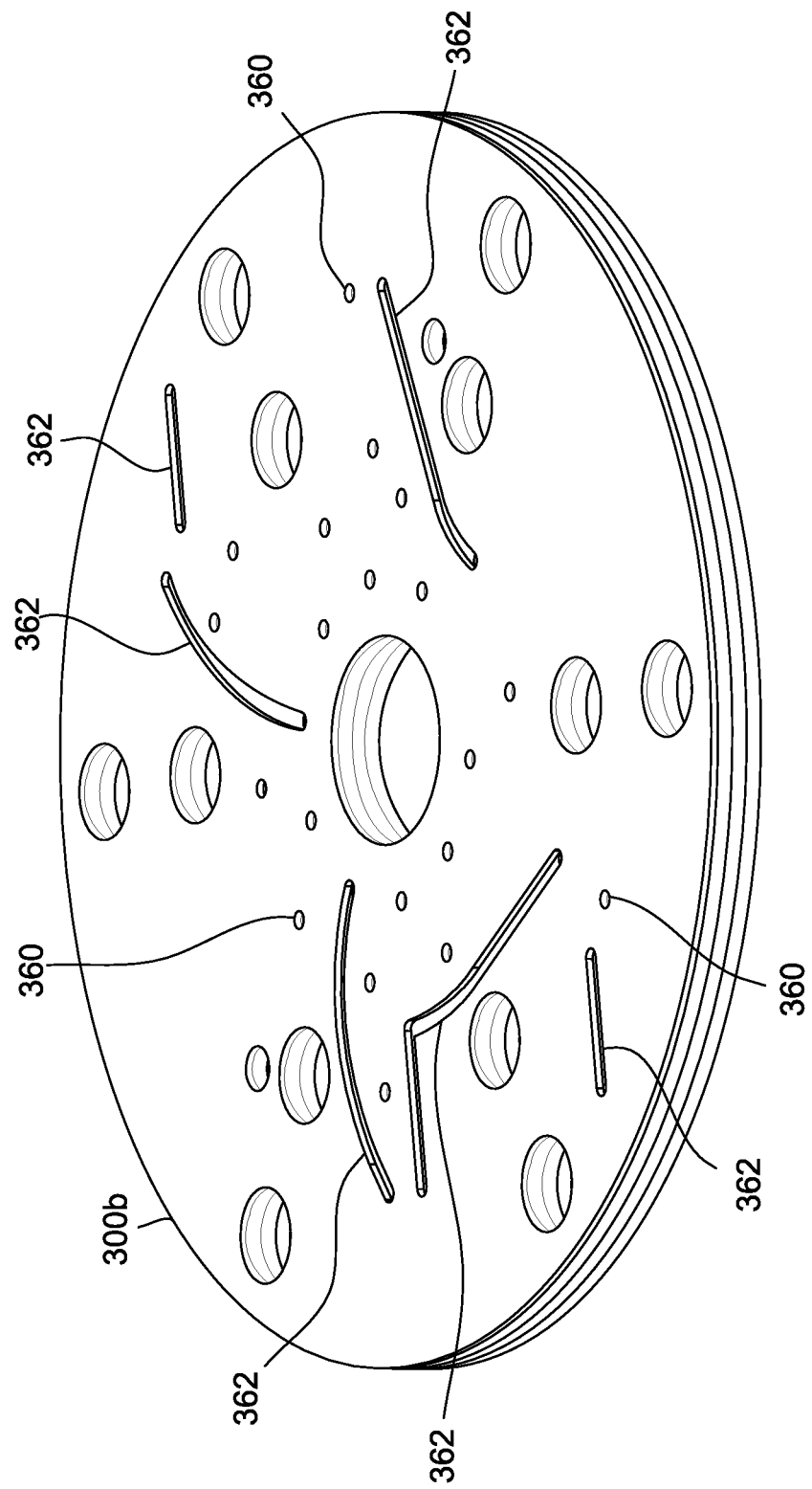
FIG. 18A illustrates a cross-sectional perspective view of the unitary distribution plate of FIG. 13.
Figure 18B:
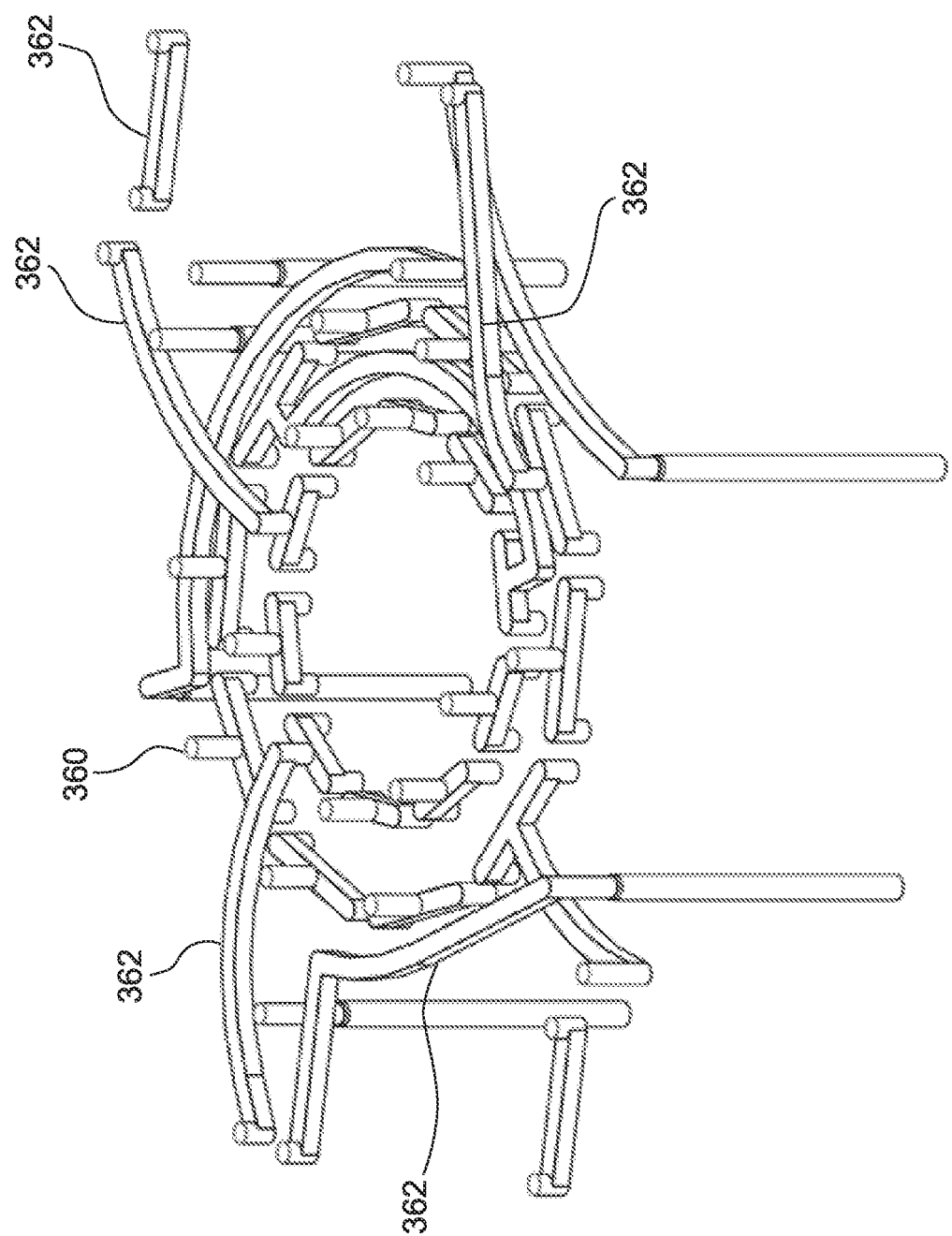
FIG. 18B illustrates a cross-sectional perspective view a plumbing arrangement of the unitary distribution plate of FIG. 13.
Figure 19A:
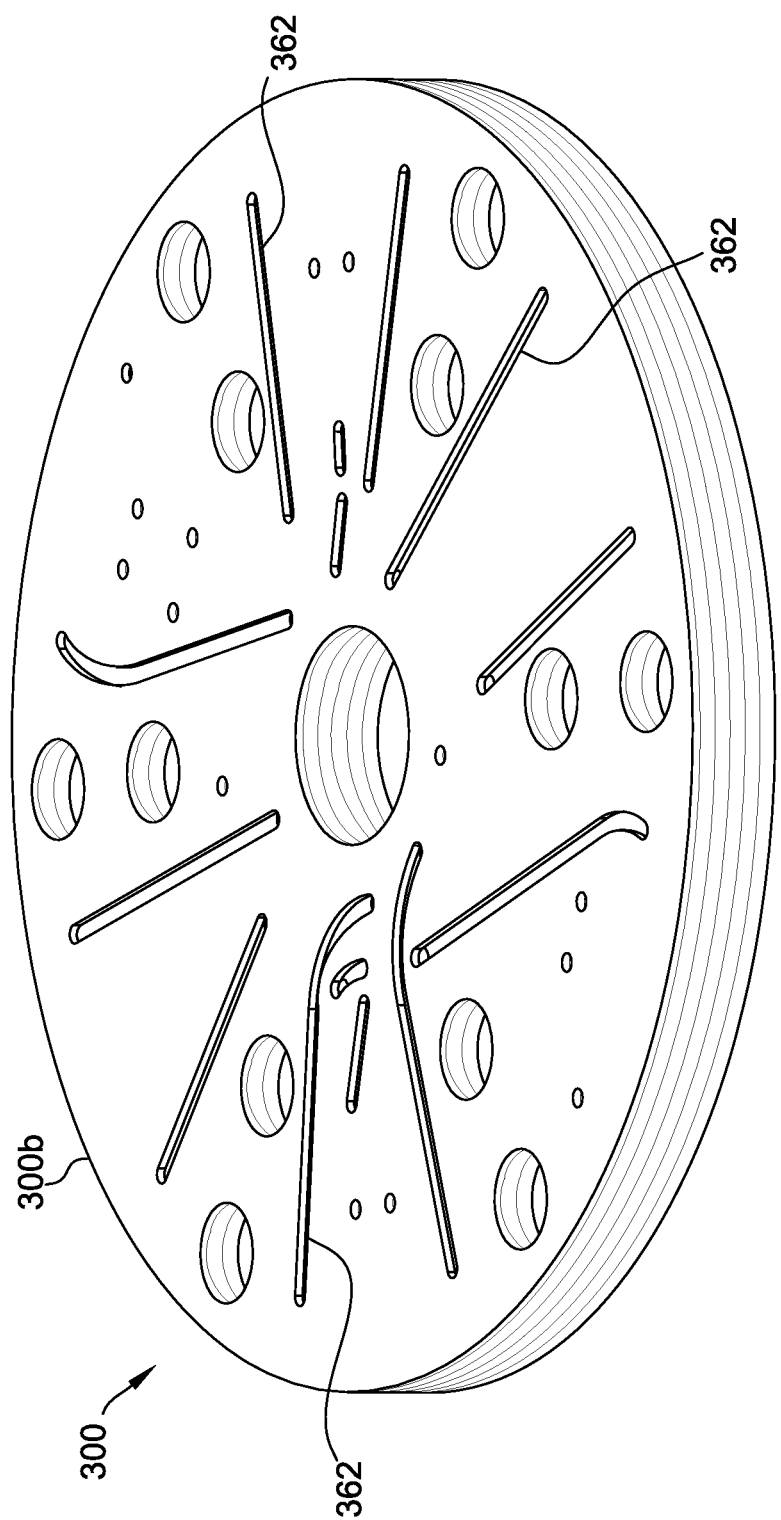
FIG. 19A illustrates a cross-sectional perspective view of the unitary distribution plate of FIG. 13.
Figure 19B:
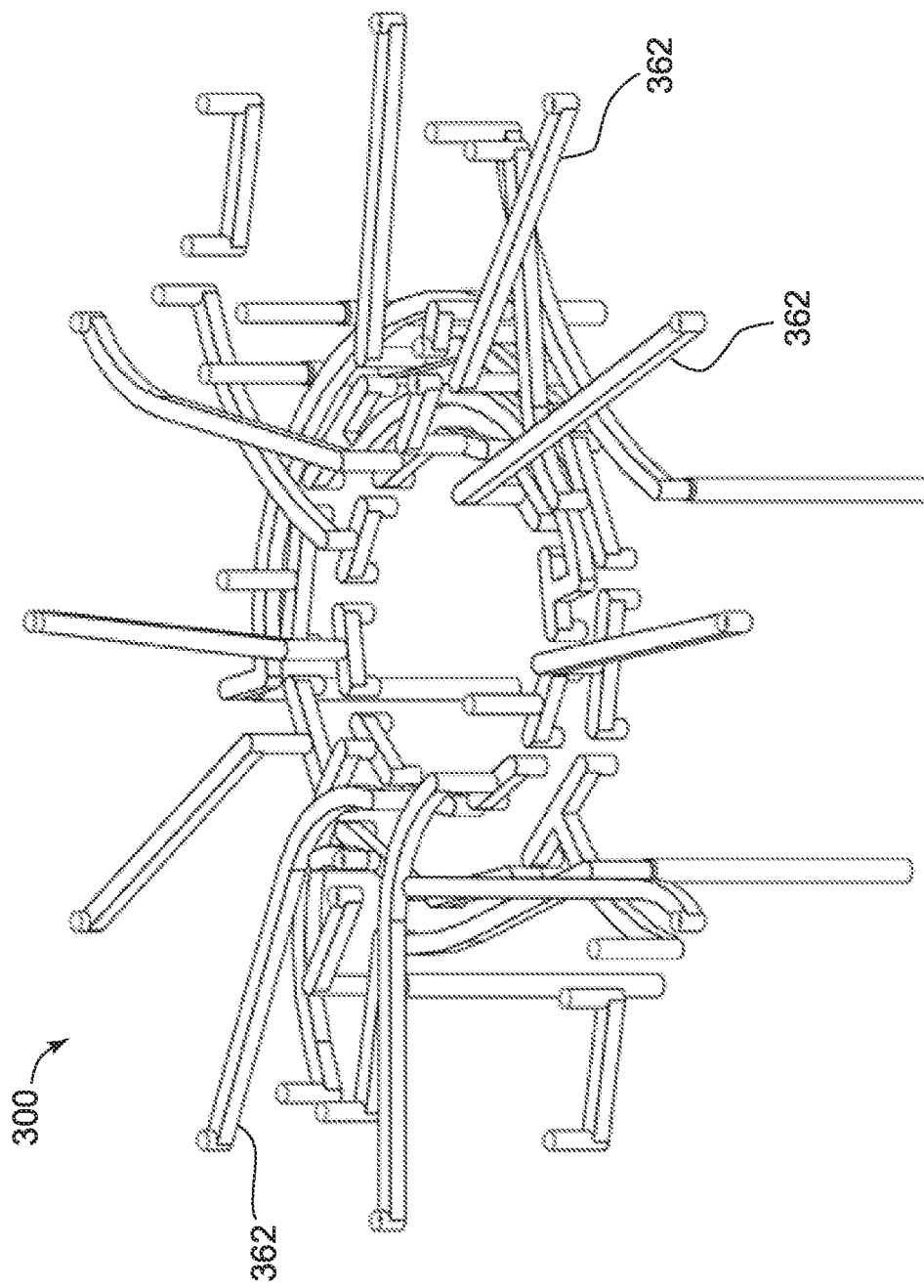
FIG. 19B illustrates a cross-sectional perspective view a plumbing arrangement of the unitary distribution plate of FIG. 13.
Figure 20A:
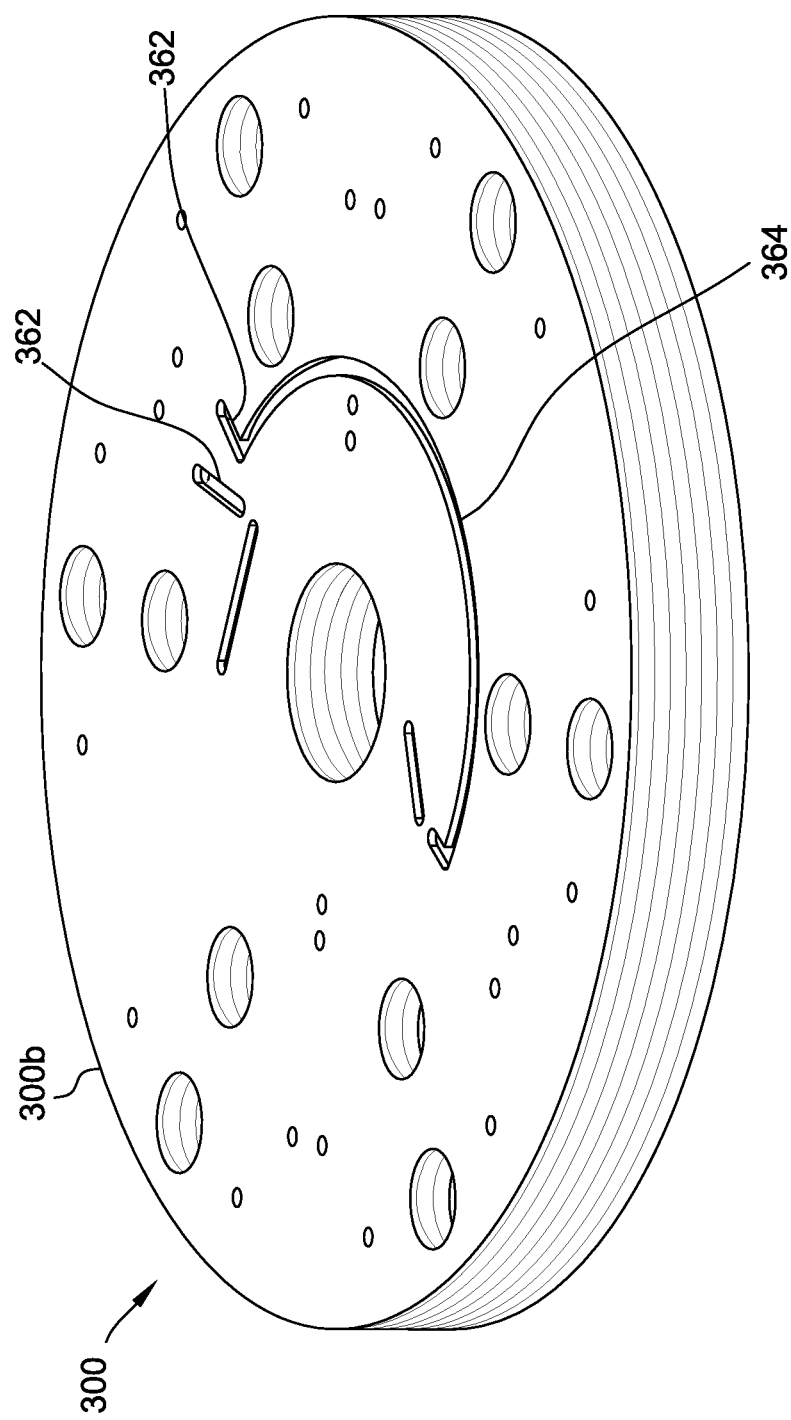
FIG. 20A illustrates a cross-sectional perspective view of the unitary distribution plate of FIG. 13.
Figure 20B:
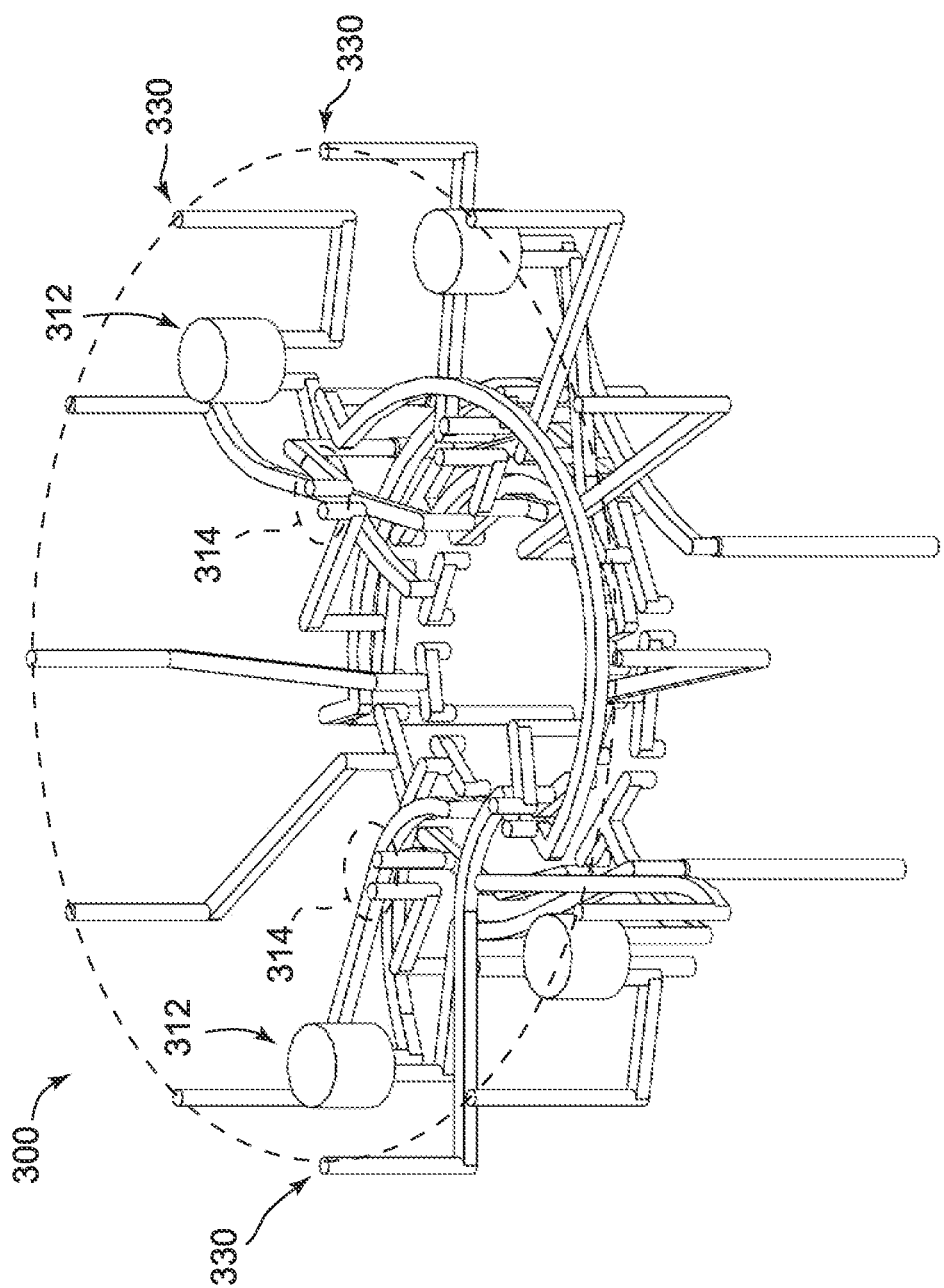
FIG. 20B illustrates a cross-sectional perspective view a plumbing arrangement of the unitary distribution plate of FIG. 13.

A method of manufacture of the unitary distribution plate comprises the steps of: boring the bores of the inner ring of valve bores 308, the outer ring of valve bores 310 and the outer ring of sample and carrier gas bores 306 into a first plate 300a as shown in FIG. 17A, and machining longitudinal fluid pathways 360, planar pathways 362 and radial fluid pathways 364 into the first plate 300a. The method further comprises machining additional longitudinal fluid pathways 360, planar pathways 362 and radial fluid pathways 364 into intermediate plates 300b as shown in FIGS. 18A, 19A and 20A. The method also comprises machining the at least one sensor cell aperture 314, least one detector cell 312 and at least one GC column port 330 into a final plate 300c as shown in FIG. 13. In some embodiments, the method further comprises machining a coaxial recessed region 303 into the final plate 300c as shown in FIG. 12. The method finally comprises the steps of diffusion bonding the first plate 300a, the intermediate plates 300b and the final plate 300c to form the unitary distribution plate 300. In some embodiments, the method further comprises the steps of surface finishing the top surface 302 and bottom surface 304 of the unitary distribution plate 300. The first plate 300a, the intermediate plates 300b and the final plate 300c are comprised of metal, such as stainless steel or aluminum.

Figure 22:
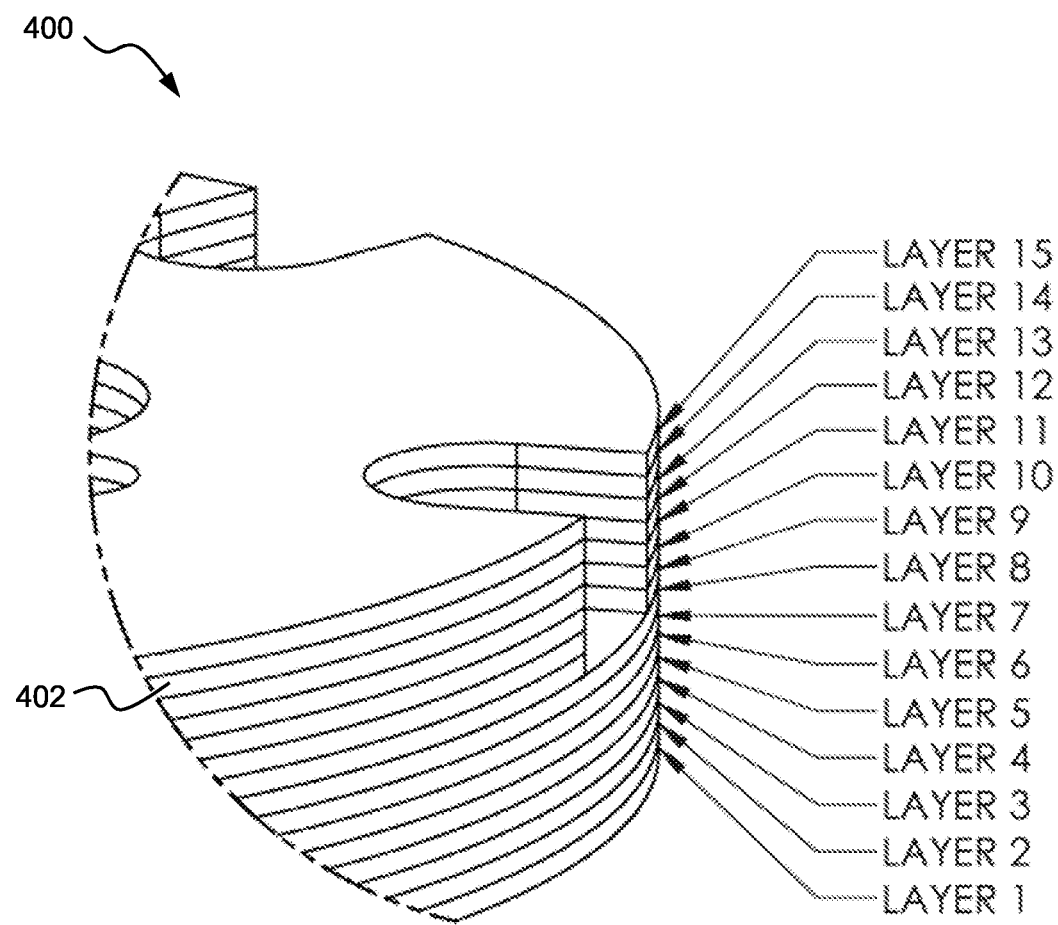

FIG. 22 illustrates a partial cross-sectional view of an exemplary distribution plate 400 having stacked layers 402 of plates which are diffusion bonded into a unitary body, forming the thickness of the distribution plate 400. In some embodiments, the distribution plate 400 comprises up to 15 layers of plates. In some embodiments, distribution plates of increasingly complex plumbing arrangements have 15 or more layers 402 of plates that are diffusion bonded into a unitary body.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A distribution plate of a gas chromatograph module comprising:
    a unitary top surface and a bottom surface defining a thickness;
    a plurality of apertures disposed on the top surface extending partially into the thickness;
    a plurality of valve bores disposed on the bottom surface extending partially into the thickness,
    wherein the plurality of valve bores are arranged in a series of ring-shaped grouping patterns about a center axis of the distribution plate; and
    a plurality of fluid pathways disposed within the thickness fluidly connecting the plurality of valve bores to the plurality of apertures,
    wherein the plurality of fluid pathways comprises pathways positioned both longitudinally and in-plane relative to the top surface, and pathways positioned radially about the center axis,
    and wherein at least one valve fluid pathway of the plurality of fluid pathways fluidly connects adjacent valve bores of the plurality of valve bores.

2. The distribution plate of claim 1, wherein at least one of the plurality of fluid pathways is positioned in-plane relative to the top surface and disposed within the thickness, and fluidly connects at least one valve fluid pathway to at least one of the plurality of apertures.

3. The distribution plate of claim 2, wherein at least one of the plurality of fluid pathways is positioned longitudinally relative to the top surface and disposed within the thickness, and fluidly connects at least one valve fluid pathway to at least one of the plurality of apertures.

4. The distribution plate of claim 3, wherein the at least one valve fluid pathway, the at least one in-plane fluid pathway and the at least one longitudinal fluid pathway form a plumbing arrangement connecting the plurality of valve bores to the plurality of apertures.

5. The distribution plate of claim 1, wherein the plurality of apertures include one or more of at least one sensor cell aperture, at least one GC column port and at least one detector cell disposed on the top surface or the bottom surface.

6. The distribution plate of claim 5 further comprising at least one carrier gas inlet, at least one sample inlet and a vent port disposed on the bottom surface.

7. The distribution plate of claim 6, wherein one or more of the at least one carrier gas inlet, the at least one sample inlet and the vent port are fluidly connected to at least one valve fluid pathway by at least one planar fluid pathway and at least one longitudinal fluid pathway.

8. The distribution plate of claim 6, wherein one or more of the at least one carrier gas inlet, the at least one sample inlet and the vent port are fluidly connected to one or more of the at least one sensor cell aperture, the at least one GC column port and the at least one detector cell by at least one planar fluid pathway and at least one longitudinal fluid pathway.

9. The distribution plate of claim 1 further comprising a diaphragm having an upper diaphragm membrane and a lower diaphragm membrane, the upper diaphragm membrane disposed against the bottom surface of the distribution plate.

10. The distribution plate of claim 9, wherein a valve is defined by a first valve bore and an adjacent second valve bore of the plurality of valve bores, and the upper diaphragm membrane.

11. The distribution plate of claim 10, wherein the upper diaphragm membrane is configured to deflect into a plurality of apertures of the lower diaphragm membrane, opening a fluid path between the first valve bore and the adjacent second valve bore.

12. The distribution plate of claim 11, wherein the plurality of apertures of the lower diaphragm member are positioned on the lower diaphragm membrane between the first valve bore and adjacent second valve bore.

13. The distribution plate of claim 11, further comprising a pilot plate having a top surface, a bottom surface, and a plurality of control holes disposed on the top surface of the pilot plate, the plurality of control holes are coaxial with the plurality of apertures of the lower diaphragm member.

14. The distribution plate of claim 13, wherein the plurality of control holes are configured to at least partially deflect the upper diaphragm membrane into the plurality of apertures of the lower diaphragm membrane upon venting of pressure from the plurality of control holes.

15. The distribution plate of claim 13, wherein the plurality of control holes are connected with a pilot port and a pressure vent port such that application of pressure or venting of pressure to the pilot port and pressure vent port simultaneously apply pressure or venting of pressure to the plurality of control holes.

16. The distribution plate of claim 15, wherein a first plurality of valves forms an inner ring of valves about the center axis and a second plurality of valves forms an outer ring of valves about the center axis.

17. The distribution plate of claim 16, wherein applying pressure to the plurality of control holes closes the first plurality of valves and the second plurality of valves.

18. The distribution plate of claim 17, wherein opening the first plurality of valves and the second plurality of valves opens a plumbing arrangement whereby carrier gas and sample gas flow from the plurality of valve bores to the plurality of apertures of the distribution plate.

19. The distribution plate of claim 1, wherein ten pairs of adjacent valve bores of the plurality of valve bores form an inner ring of valves of a two 10-port valve configuration.

20. The distribution plate of claim 19, wherein ten pairs of adjacent valve bores of the plurality of valve bores form an outer ring of valves of the two ten-port valve configuration.

21. The distribution plate of claim 1, wherein x-number of pairs of adjacent valve bores of the plurality of valve bores form an inner ring of valves of a x-number valve configuration, wherein x-number denotes an x-number of valve sets or pairs.

22. A modular valve subassembly of a GC module comprising:
    a pilot plate having a top surface, a bottom surface, and a plurality of control holes disposed coaxially on the top surface of the pilot plate;

a diaphragm having an upper diaphragm membrane disposed against the top surface of the pilot plate; and a distribution plate having a top surface and a bottom surface defining a thickness; a plurality of apertures disposed on the top surface extending partially into the thickness, a plurality of valve bores disposed on the bottom surface extending partially into the thickness, and at least one planar fluid pathway disposed within the thickness fluidly connecting the plurality of valve bores to the plurality of apertures;

wherein the plurality of control holes of the pilot plate are coaxial with a first valve bore and an adjacent second valve bore of the distribution plate;

wherein the plurality of control holes are configured to at least partially deflect the upper diaphragm membrane upon venting of pressure from the plurality of control holes; wherein the upper diaphragm membrane deflects into the plurality of control holes, opening a fluid path between the first valve bore and the adjacent second valve bore.

23. The modular valve subassembly of claim 22, wherein a valve of a plurality of valves is defined by a first valve bore and an adjacent second valve bore of the plurality of valve bores, and the upper diaphragm membrane.

24. The modular valve subassembly of claim 23, wherein the plurality of valves, the at least one planar fluid pathway forms a first plumbing arrangement connecting the plurality of valve bores to one or more of at least one sensor cell aperture, at least one port and at least one detector cell.

25. The modular valve subassembly of claim 24, wherein a second plumbing arrangement is formed by swapping out one or more of the diaphragm and the distribution plate.

26. The modular valve subassembly of claim 22 further comprising a lower diaphragm membrane having a plurality of apertures disposed coaxially on the lower diaphragm membrane, the plurality of control holes of the pilot plate are coaxial with the plurality of apertures, wherein the plurality of control holes are configured to at least partially deflect the upper diaphragm membrane into the plurality of apertures of the lower diaphragm membrane upon venting of pressure from the plurality of control holes; wherein the upper diaphragm membrane deflects into the plurality of apertures of the lower diaphragm membrane.

27. A diaphragm for opening and closing valve bores of a distribution plate of a GC module comprising:

an upper diaphragm membrane positioned against a bottom surface of the distribution plate, the upper diaphragm membrane configured to deflect at least partially into a plurality of apertures of a body disposed under the upper diaphragm membrane upon venting of pressure from the upper diaphragm membrane, the upper diaphragm defining one or more apertures, wherein deflection of the diaphragm membrane opens a fluid pathway between a first valve bore and a second valve bore disposed on the bottom surface of the distribution plate disposed against the upper diaphragm membrane such that gas flows from the body into the distribution plate through the one or more apertures of the upper diaphragm, the first valve bore positioned adjacent to the second valve bore, the upper diaphragm membrane, first valve bore and second valve bore defining a valve.

28. The diaphragm of claim 27, wherein the body is a lower diaphragm membrane having the plurality of apertures.

29. The diaphragm of claim 27, wherein the body is a pilot plate having a top surface, a bottom surface, and a plurality of control holes disposed coaxially on the top surface of the pilot plate, the upper diaphragm membrane configured to at least partially deflect into the plurality of control holes.

* * * * *